United States Patent
Satou

(10) Patent No.: US 12,147,185 B2
(45) Date of Patent: Nov. 19, 2024

(54) IMAGE FORMING SYSTEM INCLUDING CUTTING PROCESSOR THAT CUTS SHEETS IN ACCORDANCE WITH DIFFERENT CONDITIONS

(71) Applicant: Konica Minolta, Inc., Tokyo (JP)

(72) Inventor: Sakiko Satou, Kodaira (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/738,575

(22) Filed: May 6, 2022

(65) Prior Publication Data

US 2022/0397854 A1      Dec. 15, 2022

(30) Foreign Application Priority Data

Jun. 9, 2021   (JP) ................. 2021-096329

(51) Int. Cl.
| | |
|---|---|
| G06K 15/00 | (2006.01) |
| B65H 35/00 | (2006.01) |
| G03G 15/00 | (2006.01) |
| G06F 3/12 | (2006.01) |

(52) U.S. Cl.
CPC ......... *G03G 15/655* (2013.01); *B65H 35/008* (2013.01); *G03G 15/6552* (2013.01); *G06F 3/1241* (2013.01); *B65H 2801/06* (2013.01)

(58) Field of Classification Search
None
See application file for complete search history.

(56) References Cited

U.S. PATENT DOCUMENTS

2019/0185285 A1*   6/2019   Wagatsuma ........... B65H 45/18
2019/0193980 A1*   6/2019   Kiriyama ........... G03G 21/1604
(Continued)

FOREIGN PATENT DOCUMENTS

| JP | 2015112823 A | 6/2015 |
| JP | 2019-112157 A | 7/2019 |
| JP | 2019155594 A | 9/2019 |

(Continued)

OTHER PUBLICATIONS

Japanese Office Action (JPOA) dated Sep. 17, 2024 issued for Japanese patent application No. 2021-096329 and its English machine translation.

*Primary Examiner* — Dung D Tran
(74) *Attorney, Agent, or Firm* — RANKIN, HILL & CLARK LLP

(57) ABSTRACT

An image forming system includes: an image forming apparatus that forms a first image according to a job on a plurality of first sheets and inserts a second sheet between the plurality of first sheets; a cutting processor that sequentially performs cutting processing on the plurality of first sheets and the second sheet that are conveyed from the image forming apparatus; and a sheet discharging tray on which an output object obtained by the cutting processing on each of the plurality of first sheets and a slip sheet obtained by the cutting processing on the second sheet are stacked, wherein the cutting processor performs the cutting processing on each of the plurality of first sheets in accordance with a first cutting condition, and performs the cutting processing on the second sheet in accordance with a second cutting condition different from the first cutting condition.

13 Claims, 18 Drawing Sheets

(56) References Cited

U.S. PATENT DOCUMENTS

2019/0233242 A1* 8/2019 Wakabayashi ..... B65H 35/0006
2019/0382229 A1* 12/2019 Kiriyama ............. G03G 15/655

FOREIGN PATENT DOCUMENTS

| JP | 2020047151 A | 3/2020 |
| JP | 2021054608 A | 4/2021 |
| JP | 2021059022 A | 4/2021 |

* cited by examiner

SHEET FEEDING DIRECTION

IMAGE FORMING SYSTEM INCLUDING CUTTING PROCESSOR THAT CUTS SHEETS IN ACCORDANCE WITH DIFFERENT CONDITIONS

The entire disclosure of Japanese patent Application No. 2021-096329, filed on Jun. 9, 2021, is incorporated herein by reference in its entirety.

BACKGROUND

Technological Field

The present disclosure relates to an image forming system.

Description of the Related Art

JP 2019-112157 A discloses an image forming system including an image forming apparatus that forms an image on a sheet, and a post-processing apparatus that cuts the sheet on which an image is formed into a plurality of output objects having a business card size, for example.

In a case where a sheet is cut and a plurality of output objects having a small size such as a business card size are discharged, labor man-hours are required for sorting the plurality of output objects after being taken out from a sheet discharging tray. Since the sorting work takes time, productivity of the output objects decreases.

SUMMARY

The present disclosure has been made to solve the above-described problem, and an object thereof is to provide an image forming system capable of reducing time and effort required for sorting work on output objects after cutting processing.

To achieve the abovementioned object, according to an aspect of the present invention, an image forming system reflecting one aspect of the present invention comprises: an image forming apparatus that forms a first image according to a job on a plurality of first sheets and inserts a second sheet between the plurality of first sheets; a cutting processor that sequentially performs cutting processing on the plurality of first sheets and the second sheet that are conveyed from the image forming apparatus; and a sheet discharging tray on which an output object obtained by the cutting processing on each of the plurality of first sheets and a slip sheet obtained by the cutting processing on the second sheet are stacked, wherein the cutting processor performs the cutting processing on each of the plurality of first sheets in accordance with a first cutting condition, and performs the cutting processing on the second sheet in accordance with a second cutting condition different from the first cutting condition.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
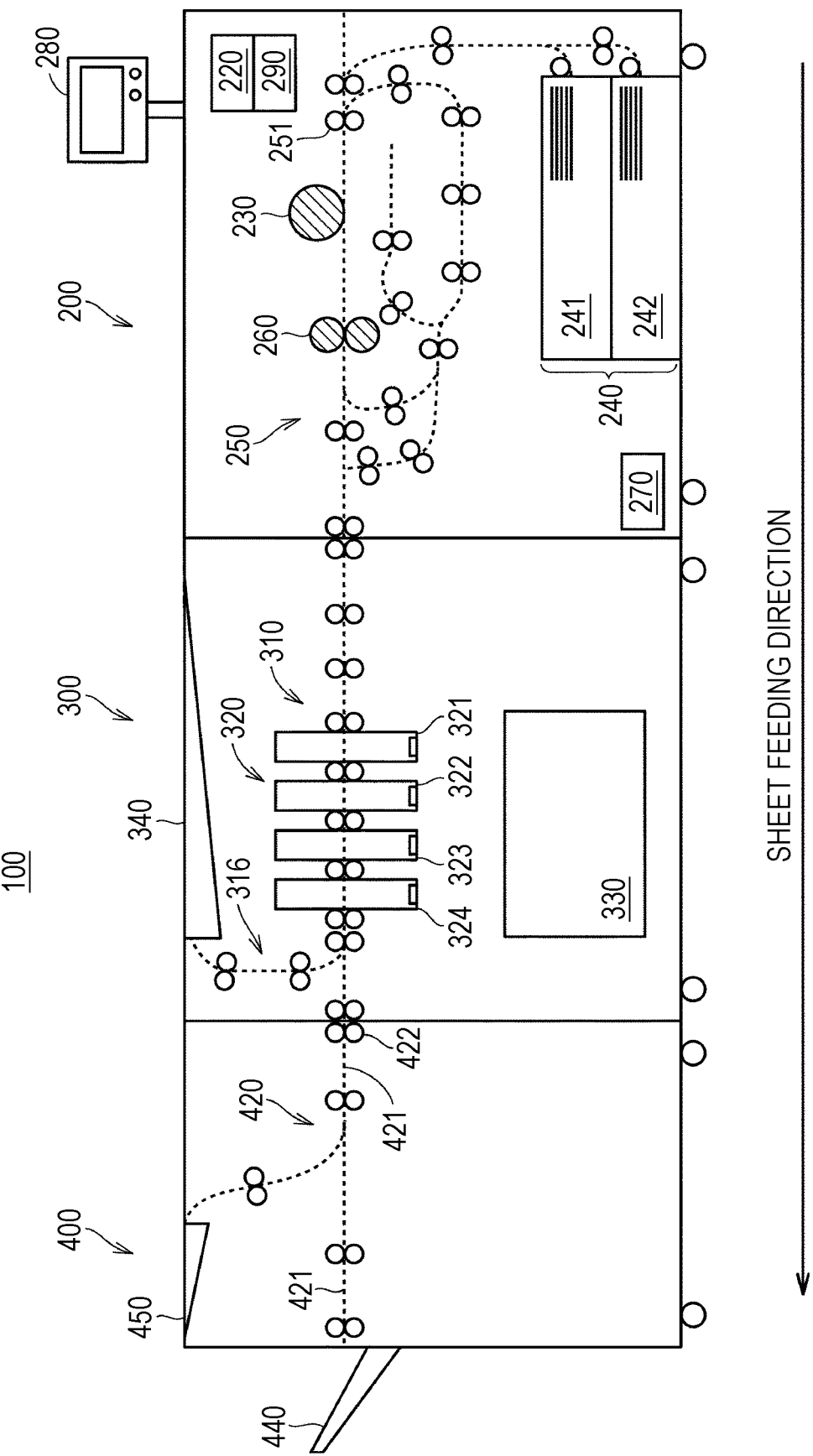
FIG. 1 is a schematic cross-sectional view of an image forming system according to a first embodiment.

Hereinafter, one or more embodiments of the present invention will be described with reference to the drawings. However, the scope of the invention is not limited to the disclosed embodiments. In the following description, the same reference numerals are used for the same parts and components. Names and functions thereof are also the same. Therefore, a detailed description thereof will not be repeated. Note that embodiments and modified examples described below may be selectively combined as appropriate.

First Embodiment

Image Forming System

Figure 2:
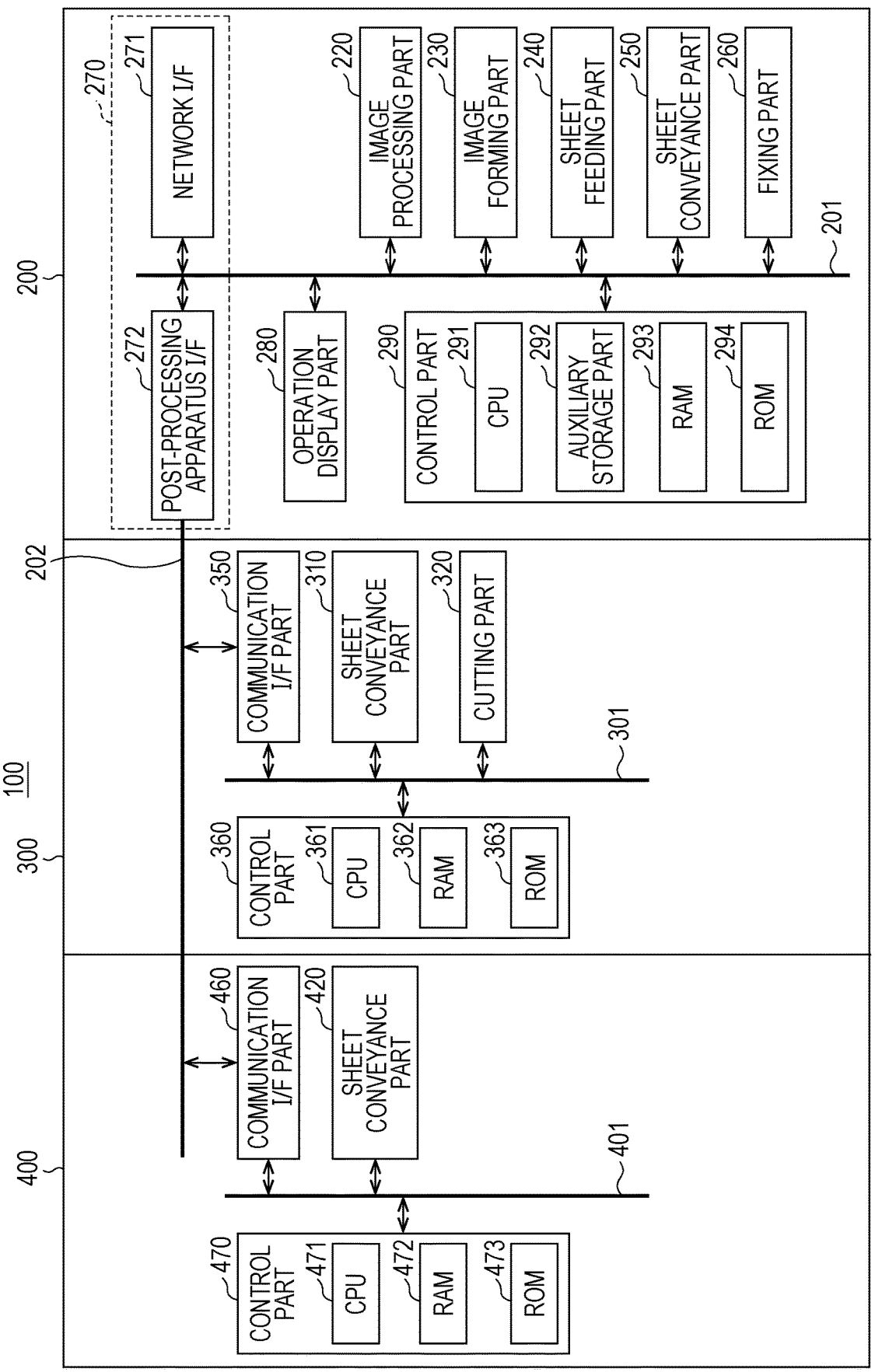
FIG. 2 is a schematic block diagram of the image forming system illustrated in FIG. 1.

FIG. 1 is a schematic cross-sectional view of an image forming system according to a first embodiment. FIG. 2 is a schematic block diagram of the image forming system illustrated in FIG. 1.

As illustrated in FIG. 1, an image forming system 100 according to the first embodiment includes an image forming apparatus 200, a cutting processor 300, and a sheet discharging apparatus 400 that are connected in series along a sheet feeding direction (also referred to as a sheet conveyance direction). Note that the configuration of the image forming system 100 illustrated in FIG. 1 is an example, and a type and the number of apparatuses included in the image forming system 100 are not limited to the example illustrated in FIG. 1.

Image Forming Apparatus

The image forming apparatus 200 receives a print job including print data and setting data from an external client terminal via a network, and forms an image on a sheet on the basis of the received print job. The setting data is data that defines printing conditions, post-processing conditions, and the like. The client terminal may be, for example, a personal computer, a tablet terminal, a smartphone, or the like.

As illustrated in FIGS. 1 and 2, the image forming apparatus 200 includes an image processing part 220, an image forming part 230, a sheet feeding part 240, a sheet conveyance part 250, a fixing part 260, a communication part 270, an operation display part 280, and a control part 290. These components are communicably connected to each other by an internal bus 201. Note that the image forming apparatus 200 may further include an image reading part that reads a document and generates image data.

The image processing part 220 generates print image data on the basis of print data and setting data included in a print job received by the communication part 270. The generated print image data is transmitted to the image forming part 230.

The image forming part 230 forms an image on a sheet on the basis of the print image data, by using a well known image forming process such as an electrophotographic method including steps of charging, exposure, development, and transfer.

The image forming part 230 includes a photoreceptor drum as an image carrier, and a charging part, an optical writing part, a developing device, and a transfer part that are disposed around the photoreceptor drum.

The photoreceptor drum is rotated at a predetermined speed by a drum motor (not illustrated). The charging part includes a corona discharge electrode disposed around the photoreceptor drum, and charges a surface of the photoreceptor drum with generated ions. The optical writing part is incorporated with a scanning optical device, and lowers a potential of an exposed portion by exposing the charged photoreceptor drum on the basis of the inputted print image data, to form a charge pattern (an electrostatic latent image) corresponding to the printed image data. The developing device develops and visualizes the formed electrostatic latent image with toner to form a toner image. The transfer part transfers the toner image on the photoreceptor drum to a sheet.

The sheet feeding part 240 supplies a sheet as a recording material, to the image forming part 230. The sheet feeding part 240 includes a first sheet feeding tray 241 and a second sheet feeding tray 242. In the first sheet feeding tray 241 and the second sheet feeding tray 242, mutually different sheets (for example, sheets having different sizes, colors, thicknesses, and the like) can be stored.

The sheet conveyance part 250 conveys a sheet in the image forming apparatus 200. The sheet conveyance part 250 includes a conveyance path and a plurality of conveyance roller pairs. In addition, the sheet conveyance part 250 includes a sheet reversing part and a circulation conveying part, and can discharge a fixed sheet with front and back sides reversed, or form images on both sides of the sheet.

A sheet supplied from the sheet feeding part 240 is conveyed along a conveyance path toward the image forming part 230. A registration roller pair 251 synchronizes the sheet with the toner image formed on the photoreceptor drum, and a timing at which the sheet is conveyed to the transfer part is controlled. The sheet to which the toner image has been transferred by the transfer part is conveyed to the fixing part 260.

The fixing part 260 fixes the toner image formed on the sheet. The fixing part 260 includes a hollow heating roller in which a heater is disposed, and a pressure roller facing the heating roller. The heating roller and the pressure roller are controlled to a predetermined temperature (for example, 100° C. or higher) by the heater, and perform heating and pressurizing processing on the sheet to fix the toner image. The sheet having passed through the fixing part 260 is supplied to the cutting processor 300.

The communication part 270 includes a network interface (I/F) 271 and a post-processing apparatus I/F 272. The network I/F 271 is connected to a client terminal such as a personal computer via a network, and transmits and receives data such as a print job. The post-processing apparatus I/F 272 is communicably connected to the cutting processor 300 and the sheet discharging apparatus 400 via a communication line 202, and transmits and receives data.

The operation display part 280 includes an input part and an output part. The input part includes, for example, a keyboard and a touch panel, and is used by a user to perform various instructions (inputs) such as character input, various settings, and a start instruction. Further, the output part includes a display, and is used to present, to the user, a device configuration, an execution status of a print job, post-processing (cutting processing and sheet discharging processing) conditions, an output preview image, an occurrence status of abnormality (jam) in sheet conveyance, and the like.

The control part 290 controls the image processing part 220, the image forming part 230, the sheet feeding part 240, the sheet conveyance part 250, the fixing part 260, the communication part 270, and the operation display part 280. The control part 290 includes a central processing unit (CPU) 291, an auxiliary storage part 292, a random access memory (RAM) 293, and a read only memory (ROM) 294.

The CPU 291 executes a control program for the image forming apparatus. The control program is stored in the auxiliary storage part 292, and loaded into the RAM 293 when executed by the CPU 291. The auxiliary storage part 292 includes, for example, a large-capacity storage device such as a hard disk drive or a flash memory. The RAM 293 stores calculation results according to the execution of the CPU 291, and a position, a type, and the like of a functional unit loaded in the cutting processor 300. The ROM 294 stores various parameters, various programs, and the like. The CPU 291 executes the control program to implement various functions.

Cutting Processor

Figure 3:
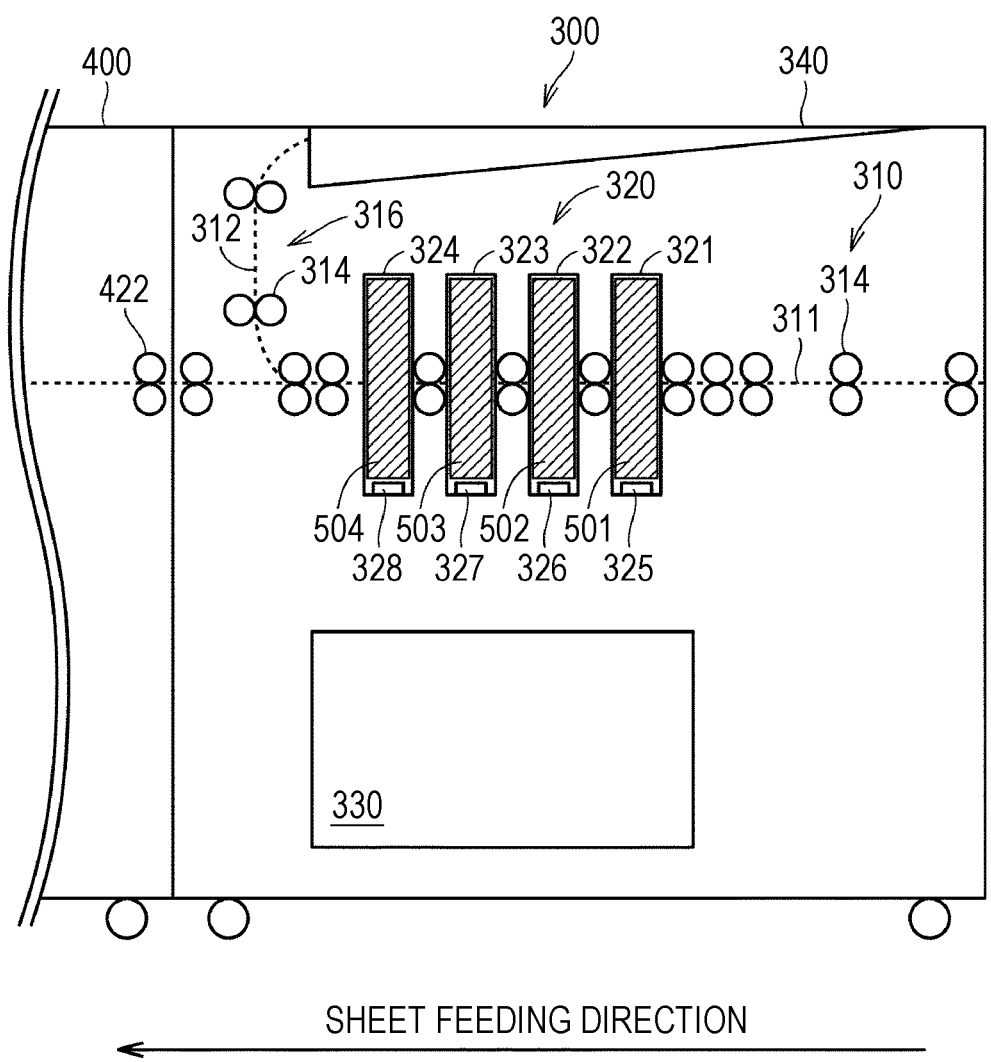
FIG. 3 is a schematic cross-sectional view illustrating a configuration of a cutting processor illustrated in FIG. 1.

A configuration of the cutting processor 300 will be described with reference to FIGS. 1 to 3. FIG. 3 is a schematic cross-sectional view illustrating a configuration of the cutting processor illustrated in FIG. 1.

The cutting processor 300 sequentially performs cutting processing on a sheet supplied from the image forming apparatus 200, in accordance with an instruction from the image forming apparatus 200.

The cutting processor 300 is disposed between the image forming apparatus 200 and the sheet discharging apparatus 400 in the image forming system 100, and includes a sheet conveyance part 310, a cutting part 320, a communication I/F part 350, and a control part 360. These components are communicably connected to each other by an internal bus 301. Further, the cutting processor 300 includes a waste box 330 and a purge tray 340.

As illustrated in FIG. 3, the sheet conveyance part 310 includes conveyance paths 311 and 312 and a plurality of conveyance roller pairs 314, and conveys a sheet supplied from the image forming apparatus 200 along the conveyance path 311 or the conveyance path 312.

Further, the sheet conveyance part 310 includes a purge conveyance part 316. The purge conveyance part 316 conveys a sheet from the cutting part 320 to the purge tray 340.

The cutting part 320 includes one or more functional units, and cuts a sheet by using the one or more functional units. The cutting part 320 has a plurality of slots 321 to 324 for loading the functional units. The slots 321 to 324 are arranged in individual loading positions along the conveyance path. FIG. 1 illustrates a case where no functional unit is loaded in any of the slots 321 to 324. Whereas, FIG. 3 illustrates a case where functional units 501 to 504 are respectively loaded in the slots 321 to 324. Each of the functional units 501 to 504 can be loaded into any of the slots 321 to 324 and can be interchanged with each other. In addition, the functional units 501 to 504 may not be loaded in all the slots 321 to 324, and may be loaded exclusively in any one of the slots 321 to 324. Further, when the slots 321 to 324 are empty, a dummy unit is loaded in such a manner that sheet conveyance is not hindered.

In the slots 321 to 324, detection sensors 325 to 328 are respectively installed. The detection sensors 325 to 328 cooperate with the control part 360 to respectively determine whether or not the functional units 501 to 504 are loaded, and acquire information on a type of the functional unit and the presence or absence of loading, that is, a loading position, in a case where the functional unit is loaded in the slots 321 to 324.

The detection sensors 325 to 328 may have any form as long as the sensor can detect the presence or absence of loading of the functional unit and the type of the functional unit, and for example, an optical sensor, an actuator, or the like can be used. Further, the control part 290 may detect the presence or absence of loading when a connector on a main body side of the cutting processor 300 is fitted and electrically connected to a connector of the functional unit, and may detect (determine) the type of the functional unit by reading an identification number stored in a control board of the functional unit after the connection.

The functional units 501 to 504 may be, for example, any of a cross direction (CD) cutting unit, a top-and-bottom slit (feed direction (FD) cutting) unit, a blead off slit unit, a crease unit, a CD perforation unit, an FD perforation unit, and a business card slit unit.

The CD cutting unit is a unit that cuts a sheet along a CD direction orthogonal to a sheet feeding direction. Further, the top-and-bottom slit unit is a unit that cuts a sheet along the sheet feeding direction. Hereinafter, the sheet feeding direction is also referred to as an "FD direction".

The blead off slit unit is a unit that forms a slit in the FD direction. For example, in the blead off slit processing, cutting is performed with two parallel cutting lines, and a slit (a groove) is formed between the two cutting lines. The crease unit is a unit that forms a streak in a predetermined direction, for example, the CD direction.

The CD perforation unit is a unit that forms a perforation in the CD direction, and the FD perforation unit is a unit that forms a perforation in the FD direction. The business card slit unit is a unit that forms a plurality of slits in the FD direction in order to cut a sheet in a business card size.

In the first embodiment, the functional units 501 to 504 include at least the CD cutting unit, the top-and-bottom slit unit, and a business card slit unit.

Note that cutting waste generated by cutting with the functional units 501 to 504 falls into the waste box 330 by its own weight to be accumulated. The user periodically discards the cutting waste in the waste box.

The communication I/F part 350 is communicably connected to the post-processing apparatus I/F 272 of the image forming apparatus 200 through the communication line 202, and transmits and receives data.

The control part 360 controls the sheet conveyance part 310, the cutting part 320, and the communication I/F part 350. The control part 360 includes a CPU 361, a RAM 362, and a ROM 363.

The CPU 361 executes a control program for the cutting processor 300, to implement various functions. The RAM 362 stores calculation results and processing results of the CPU 361, a position and a type of the functional unit loaded in the cutting part 320, and the like. The ROM 363 stores the control program, various parameters including a loading position (a position on a conveyance path) corresponding to the slot, and the like.

The control part 360 acquires a type and a loading position of the functional unit on the basis of detection results of the detection sensors 325 to 328. For example, a configuration may be adopted in which a unique unit number is allocated in advance for each type of all functional units that can be loaded into the slots 321 to 324, and the unit number is acquired as information regarding the type of the loaded functional unit. A correspondence relationship between the unit number and the type of the functional unit can be stored in the RAM 362 as a table.

Furthermore, the control part 360 derives a condition under which the cutting part 320 can perform cutting processing, in accordance with the loading position of the functional unit detected by the detection sensors 325 to 328.

Sheet Discharging Apparatus

A configuration of the sheet discharging apparatus 400 will be described with reference to FIGS. 1 and 2. In accordance with an instruction from the image forming apparatus 200, the sheet discharging apparatus 400 conveys a sheet supplied from the cutting processor 300 and discharges the sheet to outside the image forming system 100. The sheet discharging apparatus 400 is disposed on the most downstream side in the image forming system 100, and includes a sheet conveyance part 420, a communication I/F part 460, and a control part 470. These components are communicably connected to each other by an internal bus 401. Further, the sheet discharging apparatus 400 includes a main tray 440 and a purge tray 450.

The sheet conveyance part 420 includes a conveyance path 421 and a plurality of conveyance roller pairs 422, and conveys a sheet supplied from the cutting processor 300 along the conveyance path 421.

The main tray 440 discharges a usable sheet among sheets conveyed by the sheet conveyance part 420. The purge tray 450 discharges an unusable sheet among sheets conveyed by the sheet conveyance part 420.

The communication I/F part 460 is communicably connected to the post-processing apparatus I/F 272 of the image forming apparatus 200 through the communication line 202, and transmits and receives data.

The control part 470 controls the sheet conveyance part 420 and the communication I/F part 460. The control part 470 includes a CPU 471, a RAM 472, and a ROM 473.

The CPU 471 executes a control program for the sheet discharging apparatus 400, to implement various functions. The RAM 472 stores calculation results, processing results, and the like of the CPU 471. The ROM 473 stores the control program, various parameters, and the like.

Outline of Control of Image Processing System

When receiving a print job, the image forming apparatus 200 forms an image (hereinafter, referred to as a "job image") corresponding to print data included in the print job, on a sheet fed from the sheet feeding part 240. In a case where setting data included in the print job indicates a cutting condition, the cutting processor 300 performs cutting processing on the sheet on which the job image is formed, in accordance with the cutting condition. The sheet discharging apparatus 400 discharges an output object obtained by the cutting processing, to the main tray 440.

In a case where each of a plurality of sheets is cut into output objects having a small size such as a business card size, a large number of output objects are stacked on the main tray 440. The image forming system 100 according to the first embodiment inserts, between the output objects, a slip sheet having a size different from that of the output object, in order to shorten time required for sorting work on the large number of output objects stacked on the main tray 440.

The difference in size between the slip sheet and the output object facilitates sorting of the output objects. However, when the difference in size between the slip sheet and the output object is too large, it becomes difficult to handle the slip sheet and the output object together. Therefore, the image forming system 100 creates the slip sheet by performing cutting processing on a sheet different from the sheet on which the job image is formed. Hereinafter, a sheet on which a job image is formed is referred to as a "first sheet", and another sheet for creating the slip sheet is referred to as a "second sheet". As a result, the output objects obtained by cutting processing on each of a plurality of first sheets and the slip sheet obtained by cutting processing on the second sheet are stacked on the main tray 440.

The cutting processor 300 performs the cutting processing on each of a plurality of the first sheets in accordance with a first cutting condition, and performs cutting processing on the second sheet in accordance with a second cutting condition different from the first cutting condition. A size of the output object is, for example, a small size such as a business card size or a card size.

Example of Cutting Processing

Figure 4:
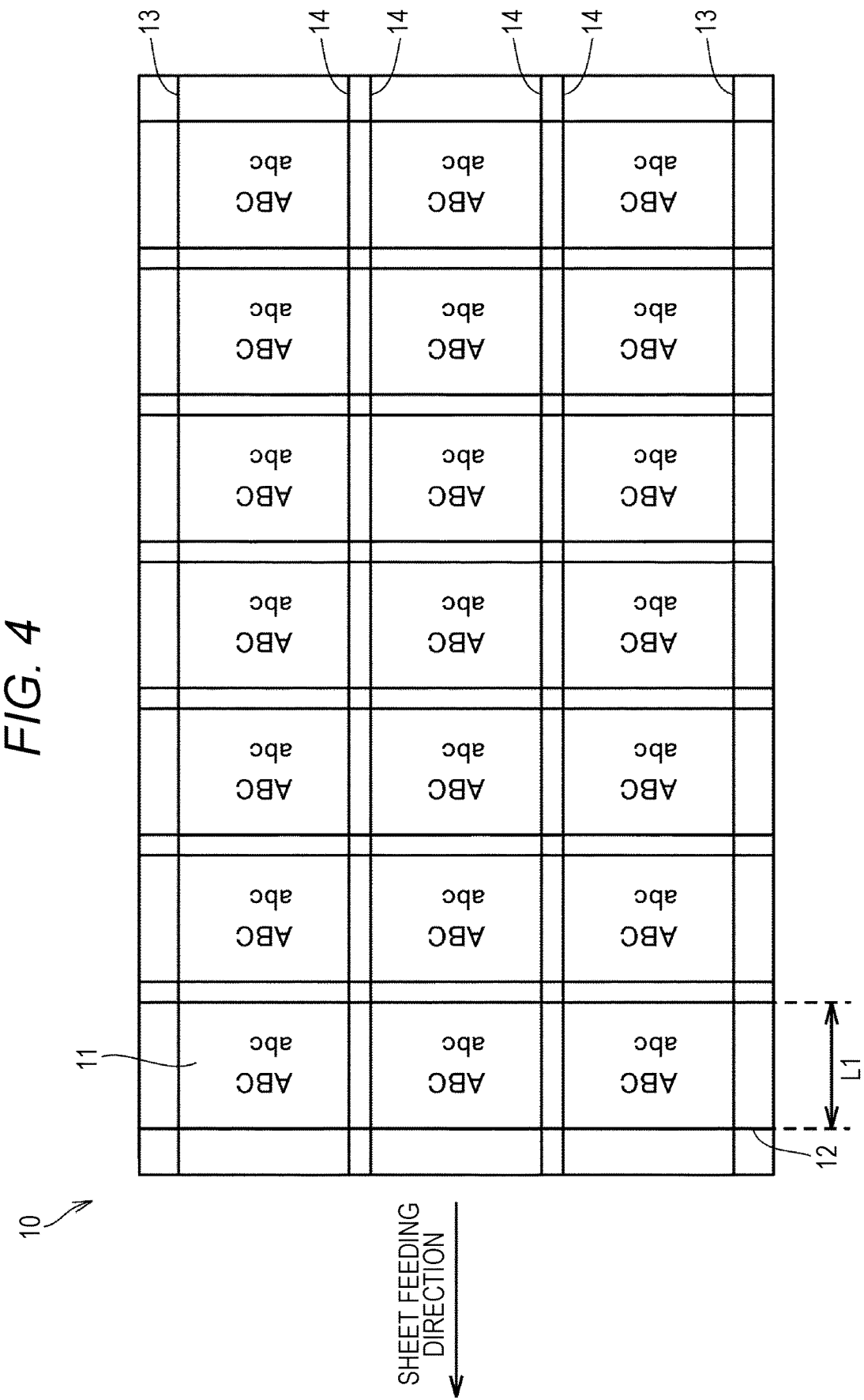
FIG. 4 is a view illustrating an example of cutting processing on a first sheet.

FIG. 4 is a view illustrating an example of cutting processing on the first sheet. FIG. 4 illustrates an example in which a first sheet 10 is cut into output objects 11 having a business card size. A line 12 along the CD direction orthogonal to the sheet feeding direction indicates a portion to be cut by the CD cutting unit. Note that, in FIG. 4, one of the plurality of lines along the CD direction is exclusively denoted by the reference numeral "12", but all of the plurality of lines indicate portions to be cut by the CD cutting unit.

A line 13 being along the sheet feeding direction (the FD direction) and located at an end of the first sheet 10 indicates a portion to be cut by the top-and-bottom slit unit. A remaining line 14 along the sheet feeding direction indicates a portion to be cut by the business card slit unit (or the blead off slit unit).

In the example illustrated in FIG. 4, three output objects 11 are cut out along the CD direction, and seven output objects 11 are cut out along the sheet feeding direction. Therefore, 21 pieces of the output object 11 are created from one first sheet 10.

Figure 5:
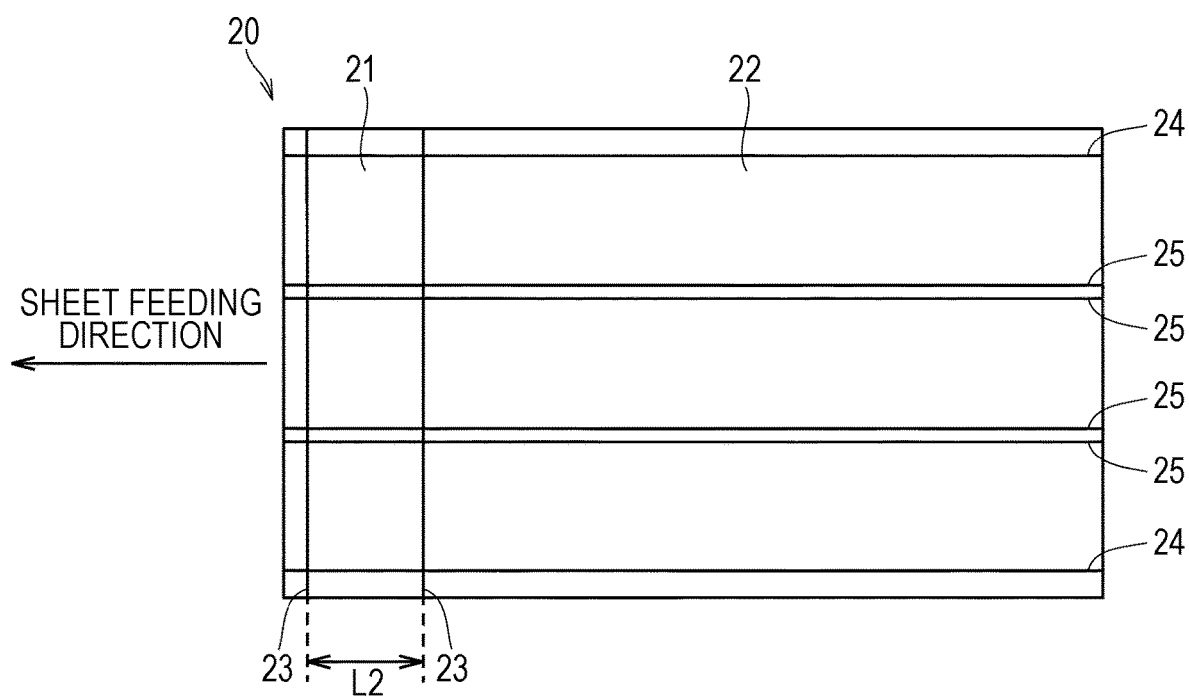
FIG. 5 is a view illustrating an example of cutting processing on a second sheet.

FIG. 5 is a view illustrating an example of cutting processing on the second sheet. FIG. 5 illustrates an example in which a second sheet 20 is cut into three slip sheets 21 and three unnecessary sheets 22. In order to sort the output objects 11, one slip sheet 21 may simply be discharged along the sheet feeding direction. Therefore, from the second sheet 20, the cutting processor 300 cuts out the slip sheet 21 and the unnecessary sheet 22 on a downstream side of the slip sheet 21 in the sheet feeding direction, by the cutting processing on the second sheet 20. In the example illustrated in FIG. 5, the cutting processor 300 cuts out three slip sheets 21 along the CD direction from the second sheet 20, and cuts out three unnecessary sheets 22 along the CD direction from the remaining portion of the second sheet 20.

A line 23 along the CD direction orthogonal to the sheet feeding direction indicates a portion to be cut by the CD cutting unit. A line 24 being along the sheet feeding direction (the FD direction) and located at an end of the second sheet 20 indicates a portion to be cut by the top-and-bottom slit unit. A remaining line 25 along the sheet feeding direction (the FD direction) indicates a portion to be cut by the business card slit unit (or the blead off slit unit).

The slip sheet 21 (see FIG. 5) has a size different from that of the output object 11 (see FIG. 4). In the example illustrated in FIGS. 4 and 5, the output object 11 and the slip sheet 21 have a rectangular shape. Then, a length L2 of a side of the slip sheet 21 parallel to the sheet feeding direction is longer than a length L1 of a side of the output object 11 parallel to the sheet feeding direction.

Example of Creation of Setting Data

As described above, the print job includes print data and setting data. The setting data indicates not only a printing condition of a job image but also a first cutting condition and a second cutting condition. Further, the setting data indicates a condition (hereinafter, referred to as an "insertion condition") for inserting a slip sheet. The setting data is generated by a client terminal or the image forming apparatus 200.

The first cutting condition for the first sheet 10 and the second cutting condition for the second sheet 20 are set such that the size of the output object 11 is different from the size of the slip sheet 21.

Figure 6:
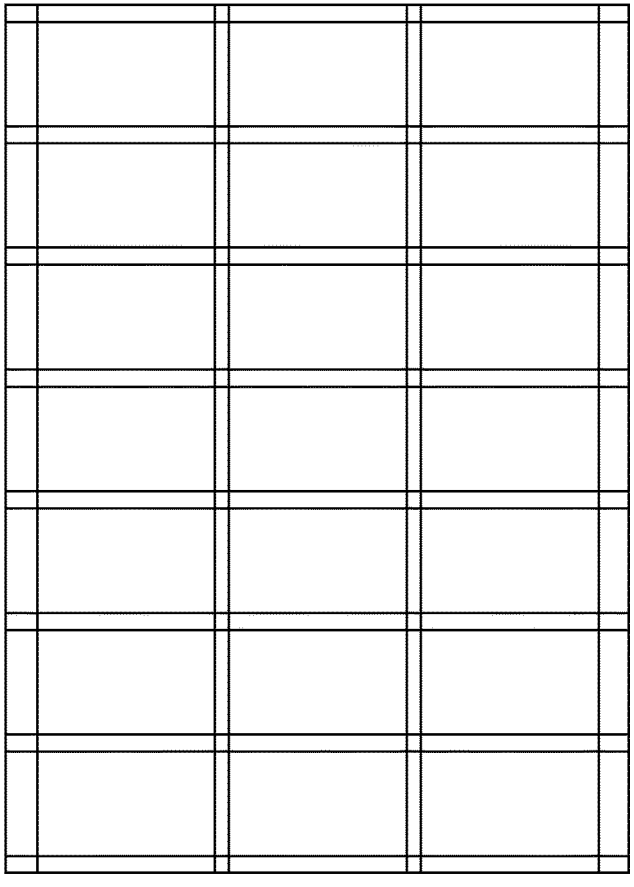
FIG. 6 is a view illustrating an example of a setting screen for setting a cutting condition in the first embodiment.

FIG. 6 is a view illustrating an example of a setting screen for setting a cutting condition in the first embodiment. A setting screen 30 illustrated in FIG. 6 is displayed on the client terminal when a print job is created. Alternatively, the setting screen 30 may be displayed on the operation display part 280 of the image forming apparatus 200. The first cutting condition and the second cutting condition are set in accordance with information inputted on the setting screen 30.

The setting screen 30 illustrated in FIG. 6 includes an area 31 that prompts input of the first cutting condition, an area 32 that displays an image view when the first sheet 10 is cut, and a button 33.

In the area 31, input fields for setting the following items (a) to (f) are displayed. (a) A length (a vertical width) of the output object 11 in a direction orthogonal to the sheet feeding direction; (b) a length (a horizontal width) of the output object 11 in the sheet feeding direction; (c) a length from a leading end of the first sheet 10 to the output object 11; (d) a length from one side of the first sheet 10 parallel to the sheet feeding direction to the output object 11; (e) a length between the output objects 11 adjacent to each other along the sheet feeding direction; and (f) a length between the output objects 11 adjacent to each other along the direction orthogonal to the sheet feeding direction.

In accordance with information inputted to the area 31, the client terminal or the image forming apparatus 200 creates an image view when the first sheet 10 is cut in accordance with the cutting condition indicated by the information, and displays the created image view in the area 32.

When the button 33 is operated, the client terminal or the image forming apparatus 200 sets the first cutting condition in accordance with information inputted in the area 31. Further, the client terminal or the image forming apparatus 200 sets the second cutting condition on the basis of the determined first cutting condition.

For example, the client terminal or the image forming apparatus 200 sets the second cutting condition including a horizontal width longer by a predetermined margin than a horizontal width included in the first cutting condition. As a result, the horizontal width included in the first cutting condition and the horizontal width included in the second cutting condition are different from each other. The client terminal or the image forming apparatus 200 may set items other than the horizontal widths of the first cutting condition and the second cutting condition to the same value.

As described with reference to FIG. 5, in order to sort the output objects 11, one slip sheet 21 may simply be discharged along the sheet feeding direction. Therefore, the client terminal or the image forming apparatus 200 may set the first cutting condition and the second cutting condition such that the number of output objects 11 created from the first sheet 10 is different from the number of slip sheets 21 created from the second sheet 20. That is, the first cutting condition includes the number of output objects 11 to be obtained from each first sheet 10. The second cutting condition includes the number of sheets of the slip sheet 21 to be obtained from the second sheet 20. In response to the input to the setting screen 30, the client terminal or the image forming apparatus 200 makes a difference between the number of the output objects 11 included in the first cutting condition and the number of the slip sheets 21 included in the second cutting condition.

Specifically, the client terminal or the image forming apparatus 200 calculates the number of the output objects 11 created from the first sheet 10 from the input to the setting screen 30 and the size of the first sheet 10, and sets the first cutting condition including the number. Further, the client terminal or the image forming apparatus 200 determines, as the number of the slip sheets 21, the number of the output objects 11 arranged in the direction orthogonal to the sheet feeding direction in the first sheet 10, and sets the second cutting condition including the determined number of the slip sheets 21.

Note that the client terminal or the image forming apparatus 200 may set the second cutting condition in accordance with information inputted on the setting screen for setting the second cutting condition.

Further, the client terminal or the image forming apparatus 200 displays a setting screen for setting the insertion condition, and sets the insertion condition in accordance with information inputted on the setting screen. The insertion condition defines, for example, the number of the output objects 11 to be stacked on the main tray 440 before the slip sheet 21 is inserted (hereinafter, referred to as a "defined number of sheets").

The client terminal or the image forming apparatus 200 creates setting data indicating the first cutting condition, the second cutting condition, and the insertion condition set in this manner.

Processing Flow of Image Forming System

Figure 7:
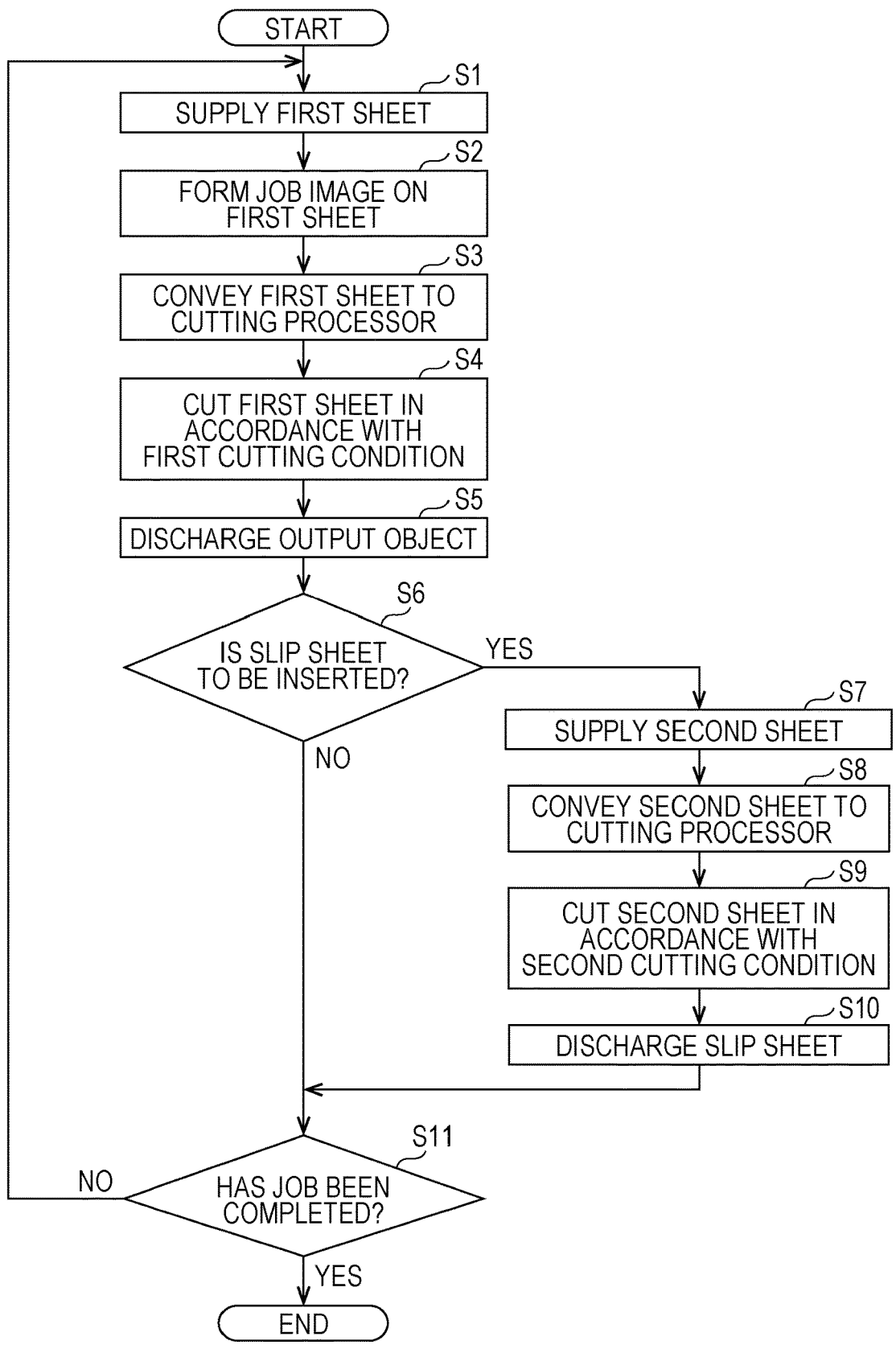
FIG. 7 is a flowchart illustrating a processing flow of the image forming system according to the first embodiment of the present invention.

FIG. 7 is a flowchart illustrating a processing flow of the image forming system according to the first embodiment. The processing illustrated in FIG. 7 is performed when the image forming apparatus 200 receives a print job including print data and setting data.

First, in step S1, the sheet feeding part 240 of the image forming apparatus 200 supplies the first sheet 10 on which a job image is to be formed. Next, in step S2, the image forming part 230 of the image forming apparatus 200 forms the job image on the supplied first sheet 10.

Next, in step S3, the sheet conveyance part 250 of the image forming apparatus 200 conveys the first sheet 10 on which the job image has been formed, to the cutting processor 300. At this time, the communication part 270 of the image forming apparatus 200 outputs a cutting instruction according to the first cutting condition indicated by the setting data of the print job, to the cutting processor 300. Further, the communication part 270 outputs the insertion condition indicated by the setting data to the sheet discharging apparatus 400.

Next, in step S4, the cutting processor 300 performs cutting processing on the first sheet 10 conveyed from the image forming apparatus 200, in accordance with the first cutting condition. By performing the cutting processing on the first sheet 10, a plurality of output objects 11 are obtained. The cutting processor 300 sequentially conveys the plurality of output objects 11 to the sheet discharging apparatus 400.

Next, in step S5, the sheet discharging apparatus 400 performs sheet discharging processing on the plurality of output objects 11 conveyed from the cutting processor 300. The control part 470 of the sheet discharging apparatus 400 includes a counter that counts the number of the output objects 11 discharged to the main tray 440. The control part 470 compares a count value of the counter with the defined number of sheets defined by the insertion condition received from the image forming apparatus 200. The control part 470 discharges the output object 11 to the main tray 440 until the count value of the counter reaches the defined number of sheets. When the count value of the counter reaches the defined number of sheets, the control part 470 discharges the output object 11 to the purge tray 450. Note that the communication I/F part 460 of the sheet discharging apparatus 400 transmits the count value of the counter, to the image forming apparatus 200.

In the next step S6, the control part 290 of the image forming apparatus 200 determines whether or not to insert a slip sheet. Specifically, the control part 290 compares the count value received from the sheet discharging apparatus 400 with the defined number of sheets defined by the insertion condition. In response to the count value reaching the defined number of sheets, the control part 290 determines to insert the slip sheet.

When YES in step S6, in step S7, the sheet feeding part 240 of the image forming apparatus 200 supplies the second sheet 20 for creating the slip sheet.

Next, in step S8, the sheet conveyance part 250 of the image forming apparatus 200 conveys the second sheet 20 to the cutting processor 300. At this time, the communication part 270 of the image forming apparatus 200 outputs a cutting instruction according to the second cutting condition indicated by the setting data of the print job, to the cutting processor 300. Further, the communication part 270 outputs a slip sheet insertion instruction to the sheet discharging apparatus 400.

Next, in step S9, the cutting processor 300 performs cutting processing on the second sheet 20 conveyed from the image forming apparatus 200, in accordance with the second cutting condition. By performing the cutting processing on the second sheet 20, the slip sheet 21 and the unnecessary sheet 22 are obtained. The cutting processor 300 conveys the slip sheet 21 to the sheet discharging apparatus 400, and discharges the unnecessary sheet 22 to the purge tray 340.

Next, in step S10, in response to the slip sheet insertion instruction from the image forming apparatus 200, the sheet discharging apparatus 400 discharges the slip sheet 21 conveyed from the cutting processor 300 to the main tray 440, and resets the value of the counter to 0.

After step S10 or when NO in step S6, in step S11, the control part 290 of the image forming apparatus 200 determines whether or not the print job has been completed. Specifically, the control part 290 compares the number of printed sheets calculated from the number of pages and the number of copies indicated by the setting data of the print job with the number of first sheets 10 on which the job image is formed. The control part 290 may simply determine that the print job has been completed in response to the number of the first sheets 10 on which the job image is formed reaching the number of printed sheets.

When NO in step S11, the process returns to step S1. When YES in step S11, the process ends.

Figure 8:
FIG. 8 is a view illustrating a stack of sheets stacked on a main tray in the first embodiment.

FIG. 8 is a view illustrating a stack of sheets stacked on the main tray in the first embodiment. FIG. 8 illustrates one stack of sheets 50 including a plurality of output objects 11 and slip sheets 21 stacked on the main tray. As illustrated in FIG. 8, when the number of output objects 11a reaches the defined number of sheets, a slip sheet 21a is inserted, and output objects 11b are stacked on the slip sheet 21a. When the number of output objects 11b reaches the defined number of sheets, a slip sheet 21b is inserted, and output objects 11c are stacked on the slip sheet 21b. When the number of output objects 11c reaches the defined number of sheets, a slip sheet 21c is inserted.

By setting the first cutting condition and the second cutting condition such that the horizontal width (the length along the sheet feeding direction) of the slip sheet 21 is longer than the horizontal width of the output object 11, the slip sheet 21 protrudes from the output object 11 as illustrated in FIG. 8. As a result, the user can easily sort the plurality of output objects 11 by using the slip sheet 21. Typically, the user can easily sort the stack of sheets 50 into the defined number of sheets of output objects 11a, 11b, and 11c.

As illustrated in FIGS. 4 and 5, when three output objects 11 and slip sheets 21 are cut out along the CD direction, three stacks of sheets 50 exist along the CD direction in the main tray 440.

Second Embodiment

An image forming system according to a second embodiment has a configuration similar to that of the image forming system 100 according to the first embodiment. However, an image forming apparatus 200 can execute variable printing.

Figure 9:
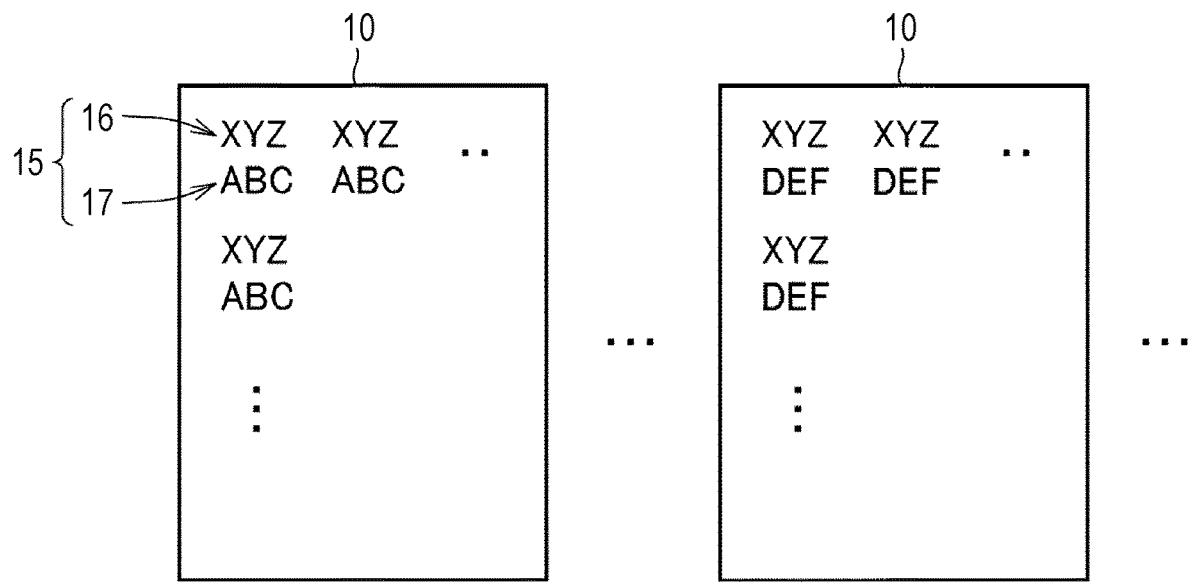
FIG. 9 is a view illustrating an example of variable printing.

FIG. 9 is a view illustrating an example of variable printing. As illustrated in FIG. 9, a job image 15 formed on a plurality of first sheets 10 includes a common image 16 common to the plurality of first sheets 10 and an individual image 17 that can be different among the plurality of first sheets 10. The image forming system according to the second embodiment sets a timing at which the individual image 17 changes as a candidate for an insertion timing of a slip sheet. For example, the user may set all the timings at which the individual image 17 changes, as the insertion timing of the slip sheet. Alternatively, the user may set some of the timings at which the individual image 17 changes, as the insertion timing of the slip sheet.

Figure 10:
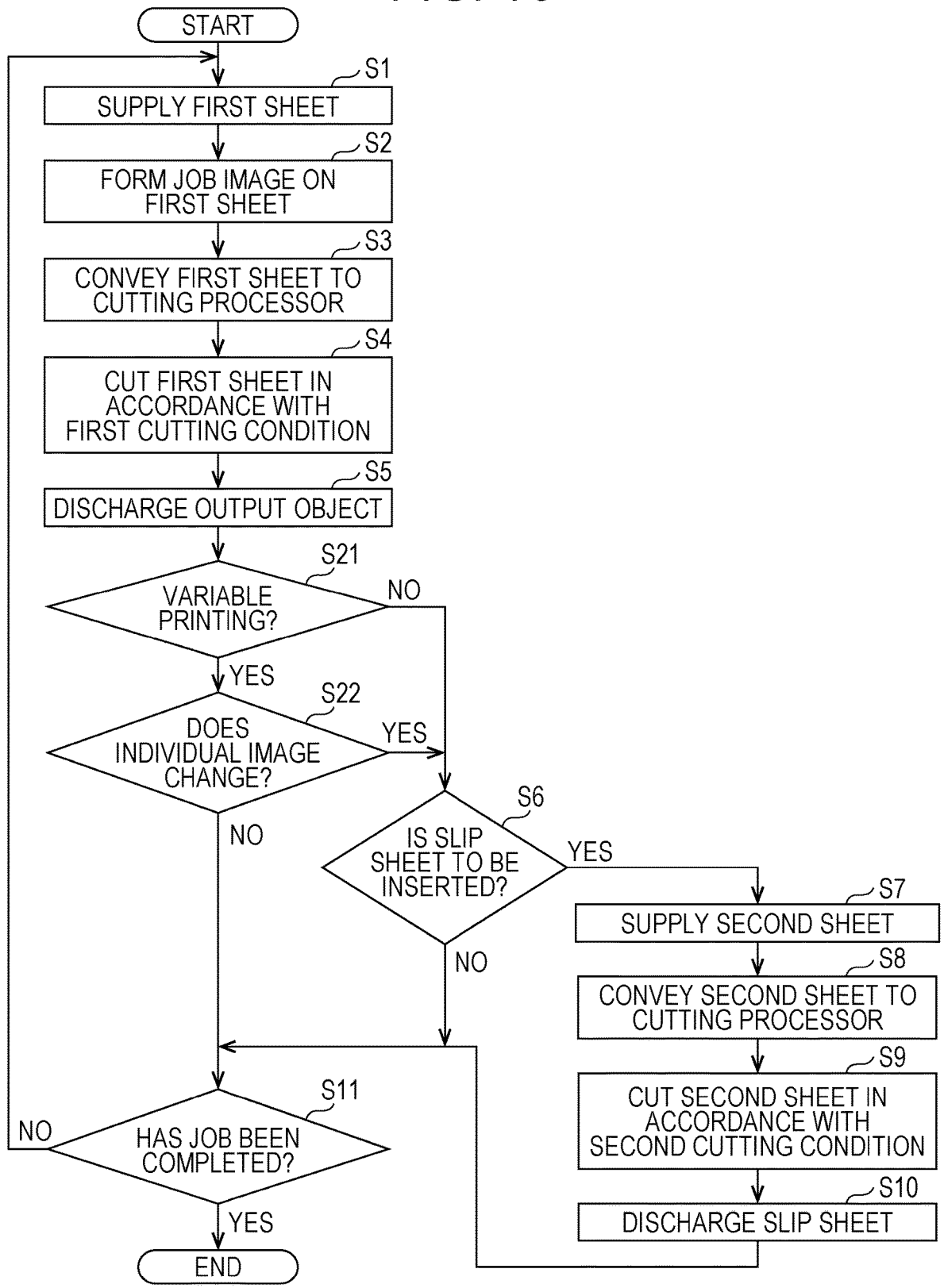
FIG. 10 is a flowchart illustrating a processing flow of an image forming system according to a second embodiment of the present invention.

FIG. 10 is a flowchart illustrating a processing flow of the image forming system according to the second embodiment of the present invention. The flowchart illustrated in FIG. 10 is different from the flowchart illustrated in FIG. 7 in that steps S21 and S22 are included after step S5. Therefore, steps S21 and S22 will be described.

In step S21, the control part 290 of the image forming apparatus 200 determines whether or not a print job is a variable printing job. When the print job is not a variable printing job (NO in step S21), the process proceeds to step S6.

When the print job is a variable printing job (YES in step S21), in step S22, the control part 290 determines whether or not it is a timing at which the individual image 17 changes. When the individual image 17 does not change (NO in step S22), the process proceeds to step S11.

When the individual image 17 changes (YES in step S22), the process proceeds to step S6. That is, the control part 290 determines whether or not to insert a slip sheet.

When NO in step S21, in step S6, the control part 290 determines whether or not to insert a slip sheet in accordance with a method similar to that in the first embodiment. When YES in step S22, in step S6, the control part 290 may simply determine whether or not the current timing at which the individual image 17 changes is set as the insertion timing of the slip sheet.

Figure 11:
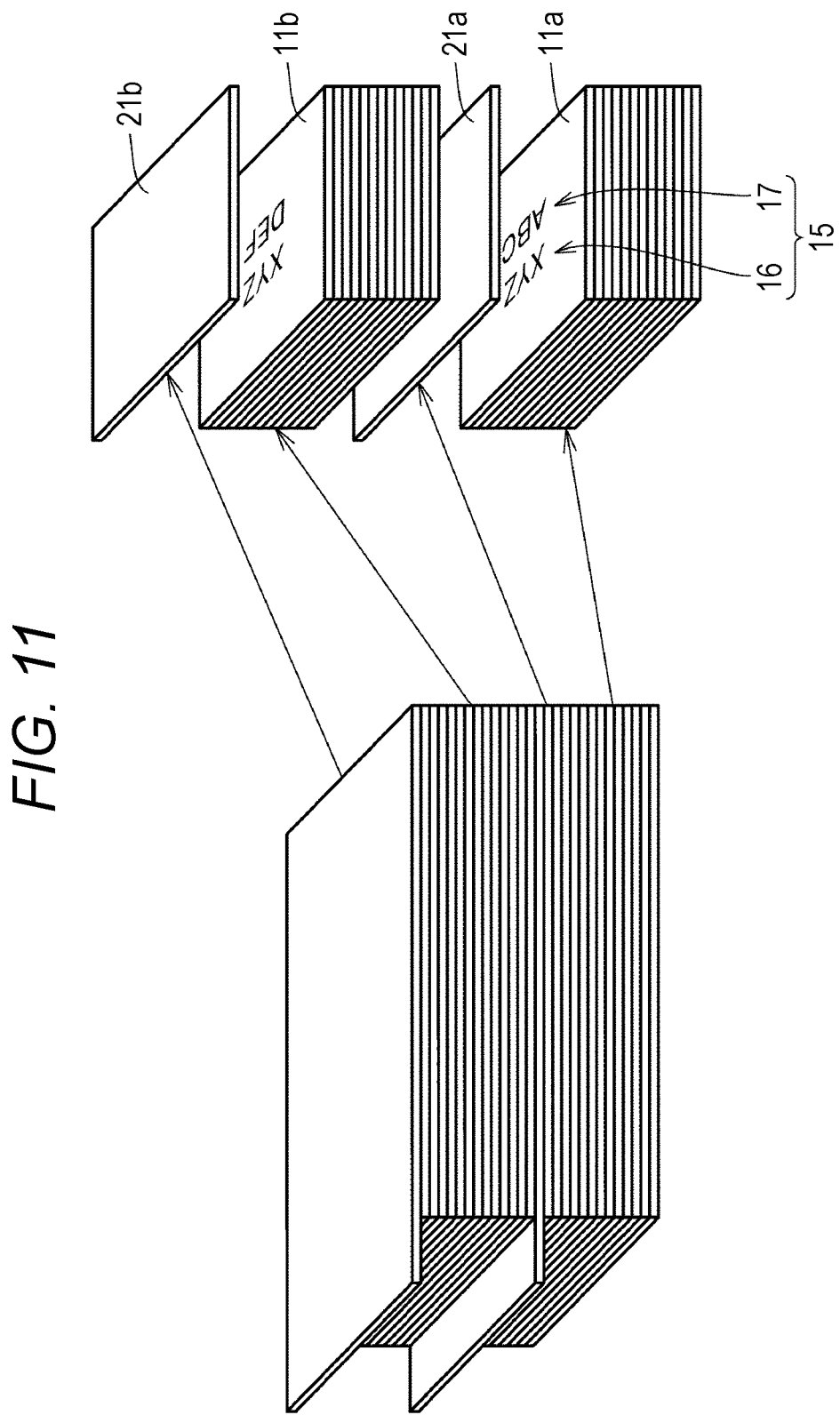
FIG. 11 is a view illustrating a stack of sheets stacked on a main tray in the second embodiment.

FIG. 11 is a view illustrating a stack of sheets stacked on a main tray in the second embodiment. As illustrated in FIG. 11, the job image 15 including the common image 16 and the individual image 17 is formed in output objects 11a and 11b. The individual image 17 formed on the output object 11a is different from the individual image 17 formed on the output object 11b. A slip sheet 21a is inserted between the output object 11a and the output object 11b where the individual image 17 changes. As a result, the user can easily sort the output object 11a and the output object 11b.

Third Embodiment

An image forming system according to a third embodiment has a configuration similar to that of the image forming system 100 according to the first embodiment. However, in the third embodiment, an image forming apparatus 200 supplies a first sheet 10 from one of a first sheet feeding tray 241 and a second sheet feeding tray 242, and supplies a second sheet 20 from another one of the first sheet feeding tray 241 and the second sheet feeding tray 242. For example, the first sheet feeding tray 241 is used to supply the first sheet 10, and the second sheet feeding tray 242 is used to supply the second sheet 20. This allows the user to easily make a difference between a type of the first sheet 10 stored in the first sheet feeding tray 241 and a type of the second sheet 20 stored in the second sheet feeding tray 242. For example, the user can use white paper as the first sheet 10 and colored paper as the second sheet 20. This allows a slip sheet 21 to be easily found from a stack of sheets stacked on a main tray 440.

Fourth Embodiment

An image forming system according to a fourth embodiment has a configuration similar to that of the image forming system 100 according to the first embodiment. However, an image forming apparatus 200 also forms an image (hereinafter, referred to as an "index image") on a second sheet 20. Since the index image is formed on the second sheet 20, it is easy to find a slip sheet 21 from a stack of sheets stacked on a main tray 440.

Figure 12:
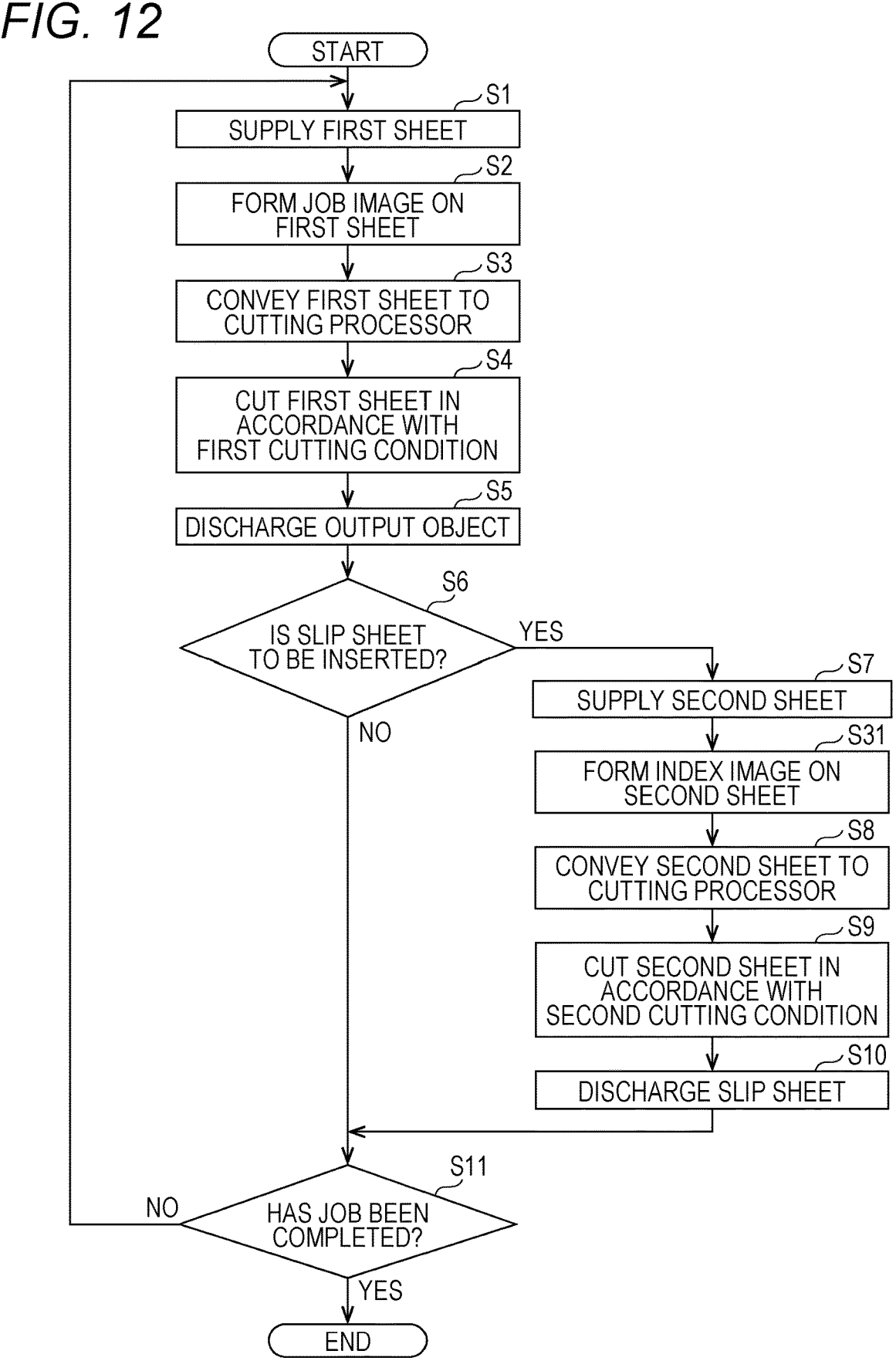
FIG. 12 is a flowchart illustrating processing flow of an image forming system according to a fourth embodiment of the present invention.

FIG. 12 is a flowchart illustrating a processing flow of the image forming system according to the fourth embodiment. The flowchart illustrated in FIG. 12 is different from the flowchart illustrated in FIG. 7 in that step S31 is included after step S7. Therefore, step S31 will be described.

In step S31, an image forming part 230 of the image forming apparatus 200 forms an index image on a supplied second sheet 20. The index image may be a predetermined image or an image designated by the user. The image forming part 230 forms the index image in a target area of the second sheet 20. The target area is preferably an area that protrudes from an output object 11 in the slip sheet 21 when the slip sheet 21 is discharged to the main tray 440.

Figure 13:
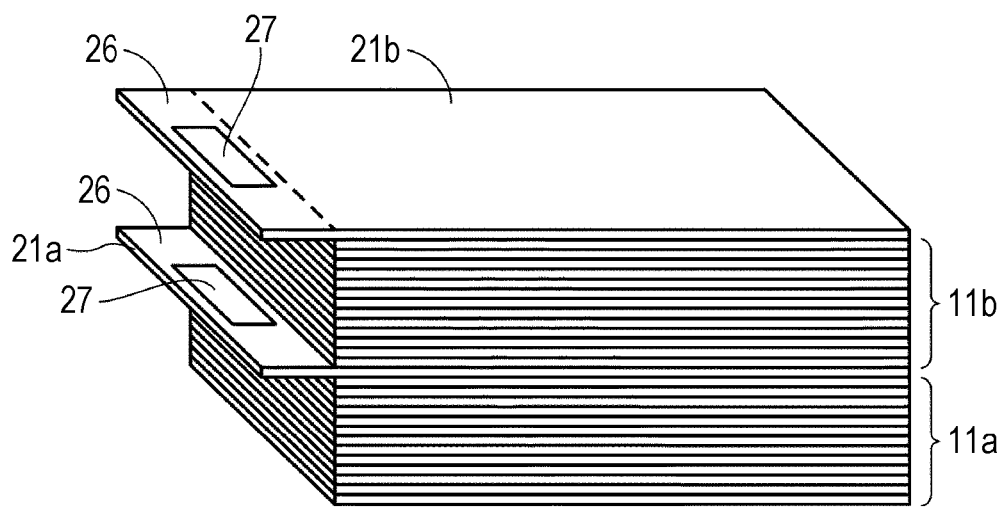
FIG. 13 is a view illustrating a stack of sheets stacked on a main tray in the fourth embodiment.

FIG. 13 is a view illustrating a stack of sheets stacked on the main tray in the fourth embodiment. As illustrated in FIG. 13, in the slip sheet 21, an index image 27 is formed in a target area 26 protruding from the output object 11.

The index image 27 includes, for example, a colored solid image, a number, a symbol, a character, a barcode, a two-dimensional code, and the like.

Fifth Embodiment

A fifth embodiment is a combination of the second embodiment and the fourth embodiment. An image forming system according to the fifth embodiment has a configuration similar to that of the image forming system 100 according to the first embodiment. However, an image forming apparatus 200 can execute variable printing, and forms an index image on a second sheet 20.

Figure 14:
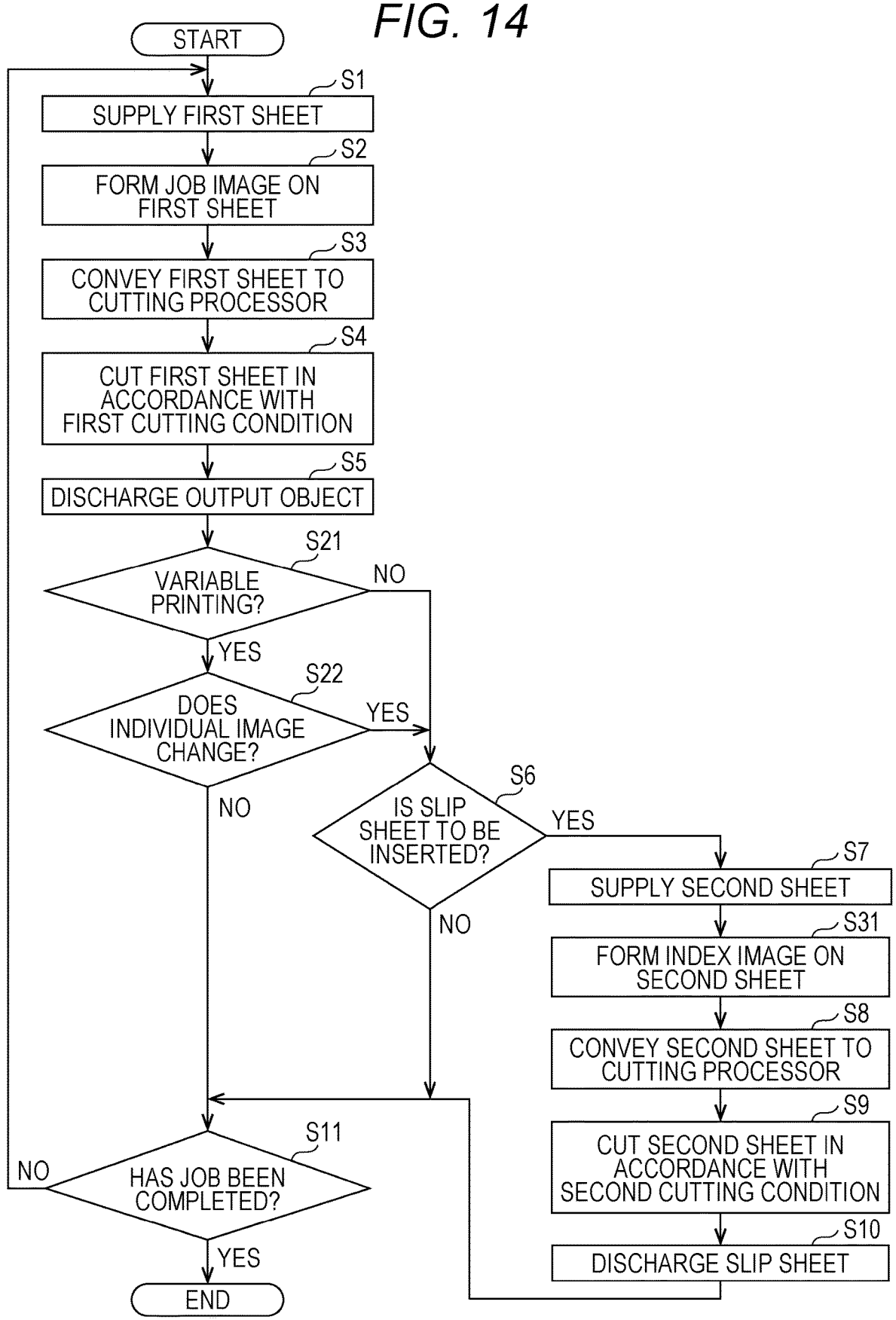
FIG. 14 is a flowchart illustrating a processing flow of an image forming system according to a fifth embodiment of the present invention.

FIG. 14 is a flowchart illustrating a processing flow of the image forming system according to the fifth embodiment. The flowchart illustrated in FIG. 14 is different from the flowchart illustrated in FIG. 7 in that steps S21 and S22 are included after step S5, and step S31 is included after step S7. Steps S21 and S22 are as described in the second embodiment, and step S31 is as described in the fourth embodiment.

Figure 15:
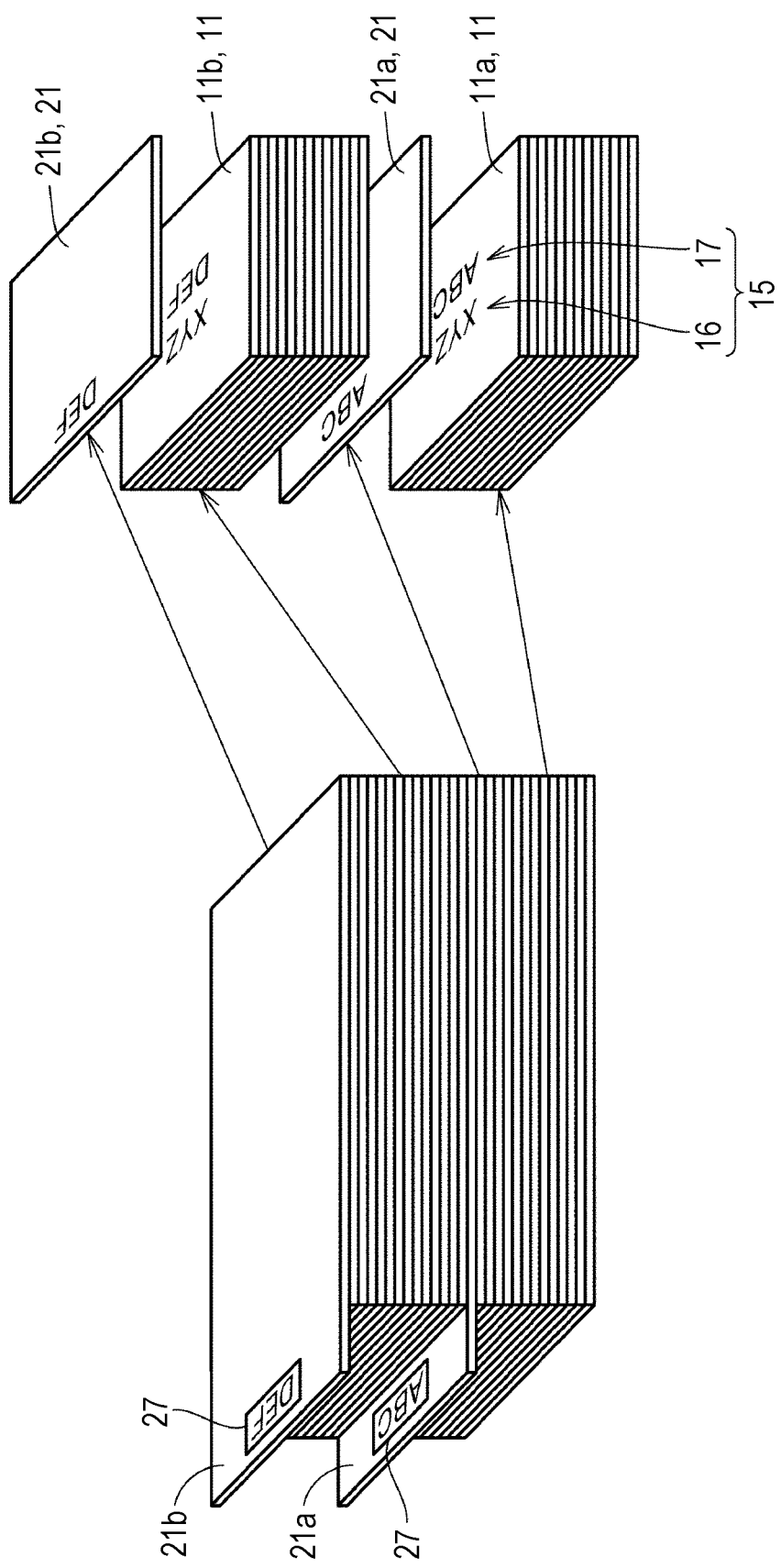
FIG. 15 is a view illustrating an example of a stack of sheets stacked on a main tray in the fifth embodiment.

FIG. 15 is a view illustrating an example of a stack of sheets stacked on a main tray in the fifth embodiment. As illustrated in FIG. 15, an individual image 17 formed on an output object 11a is different from an individual image 17 formed on an output object 11b.

Preferably, the image forming apparatus 200 determines, as an index image 27, the individual image 17 to be formed on a first sheet 10 before the second sheet 20 is inserted, and forms the index image 27 in a target area 26 of the second sheet 20. As a result, on a slip sheet 21 created by cutting the second sheet 20, as illustrated in FIG. 15, the index image 27 same as the individual image 17 formed on the output object 11 that is present immediately below the slip sheet 21 is formed. Specifically, in a slip sheet 21a, the index image 27 same as the individual image 17 formed in the output object 11a stacked immediately below the slip sheet 21a is formed. On a slip sheet 21b, the index image 27 same as the individual image 17 formed on the output object 11b stacked immediately below the slip sheet 21b is formed. As a result, the user can recognize a job image formed on the output object 11 immediately below the slip sheet 21 by viewing the index image 27 of the slip sheet 21, and can easily sort a plurality of output objects 11.

Note that the index image 27 is not necessarily the same image as the individual image 17, and may be an image related to the individual image 17. For example, the index image 27 may be a barcode or a two-dimensional code obtained by encoding the individual image 17.

The image forming apparatus 200 may insert the second sheet 20 when the individual image 17 changes, and form the index image 27 on both sides (a first surface and a second surface) of the second sheet 20. In this case, the index image 27 formed on the first surface is preferably the individual image 17 formed on the output object 11 in contact with the first surface in a main tray 440 or an image related to the individual image 17. Similarly, the index image 27 formed on the second surface is preferably the individual image 17 formed on the output object 11 in contact with the second surface in the main tray 440 or an image related to the individual image 17.

Figure 16:
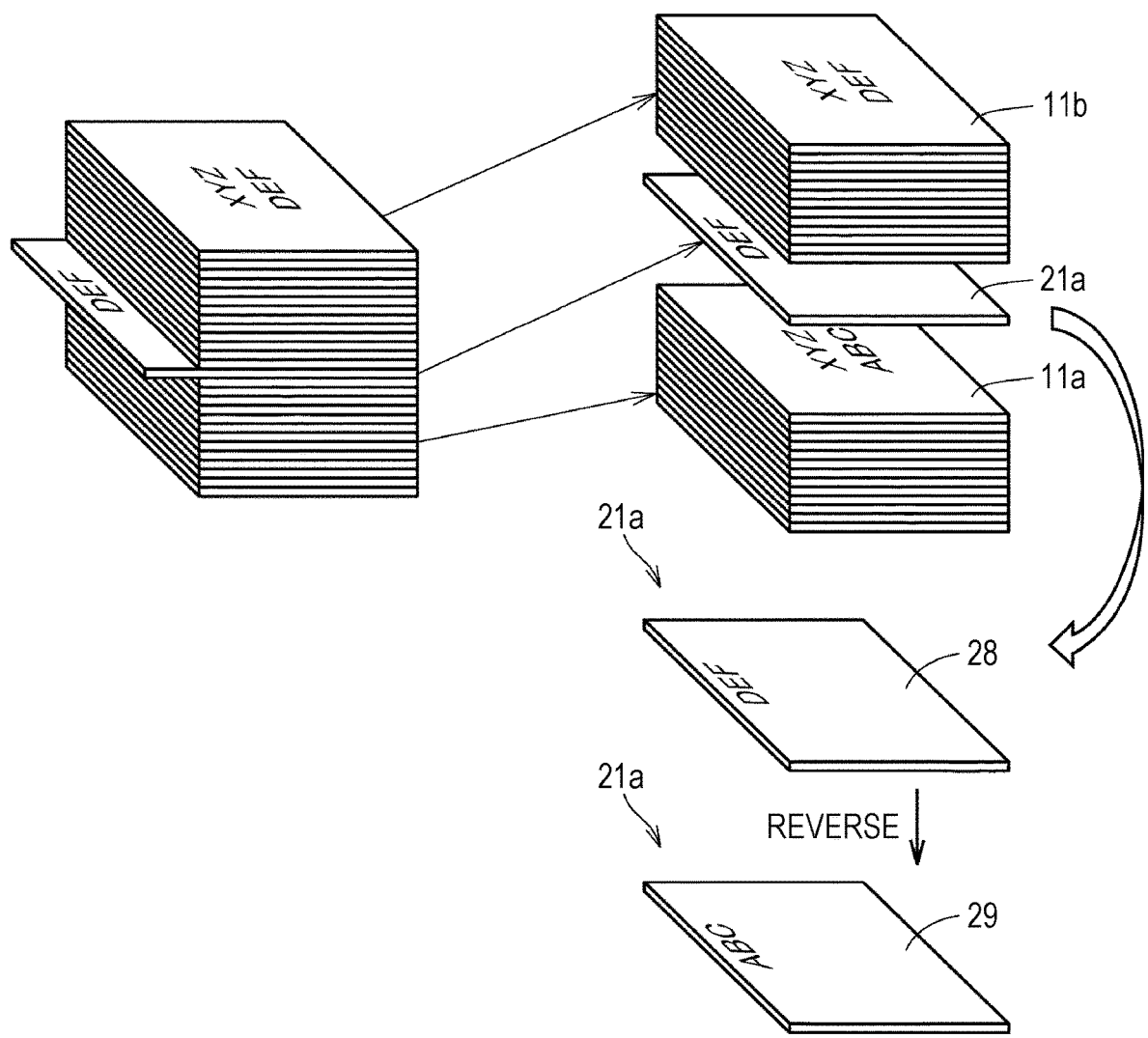
FIG. 16 is a view illustrating a stack of sheets stacked on a main tray in the fifth embodiment.

FIG. 16 is a view illustrating a stack of sheets stacked on the main tray in the fifth embodiment. As illustrated in FIG. 16, the index image 27 same as the individual image 17 formed on the output object 11b in contact with a first surface 28 is formed on the first surface 28 of the slip sheet 21a. On a second surface 29 of the slip sheet 21a, the index image 27 same as the individual image 17 formed on the output object 11a in contact with the second surface 29 is formed.

Sixth Embodiment

An image forming system according to a sixth embodiment has a configuration similar to that of the image forming system 100 according to the first embodiment. However, an image forming apparatus 200 has a first mode in which a second sheet 20 is supplied after a first sheet 10 and a second mode in which the first sheet 10 is supplied after the second sheet 20.

Figure 17:
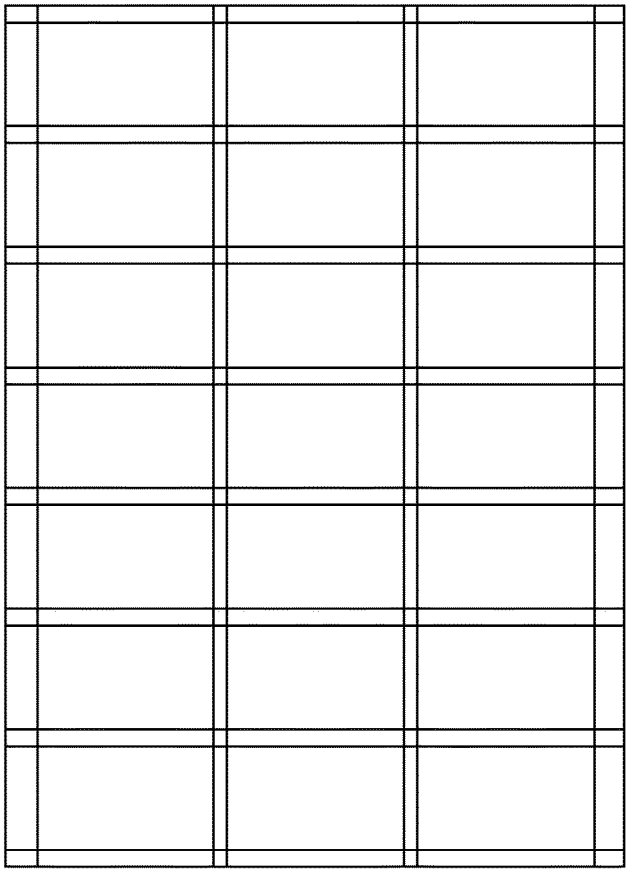
FIG. 17 is a view illustrating an example of a setting screen for setting a cutting condition in a sixth embodiment.

FIG. 17 is a view illustrating an example of a setting screen for setting a cutting condition in the sixth embodiment. A setting screen 30A illustrated in FIG. 17 is different from the setting screen 30 illustrated in FIG. 6 in that radio buttons 34a and 34b and a check box 35 are included.

The radio button 34a is a button for selecting the first mode. The radio button 34b is a button for selecting the second mode. Setting data including a flag indicating which of the first mode and the second mode is selected is created in accordance with a selection state of the radio buttons 34a and 34b when a button 33 is operated.

The check box 35 is checked when a surface on which an image is formed faces downward. When the button 33 is operated in a state where the check box 35 is checked, setting data indicating face down is created. When the setting data indicates face down, a sheet conveyance part 250 of the image forming apparatus 200 reverses front and back sides of the sheet. As a result, an output object 11 is discharged to a main tray 440 with a surface on which the image is formed facing downward.

Figure 18:
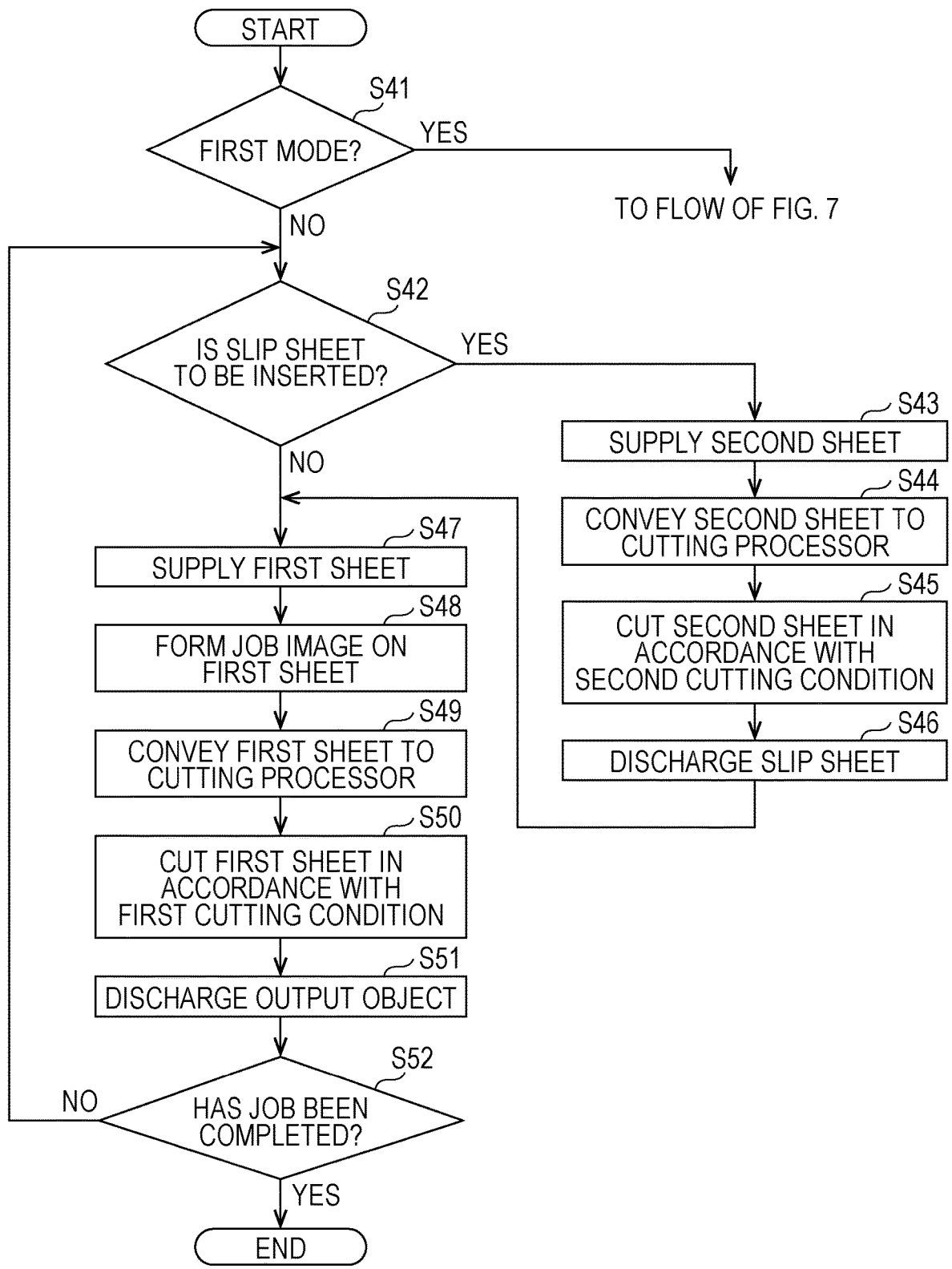
FIG. 18 is a flowchart illustrating a processing flow of an image forming system according to the sixth embodiment.

FIG. 18 is a flowchart illustrating a processing flow of the image forming system according to the sixth embodiment.

In step S41, a control part 290 of the image forming apparatus 200 checks a flag included in setting data of a print job, and determines whether or not the first mode is selected. When the first mode is selected (YES in step S41), the process proceeds to the flow illustrated in FIG. 7.

When the second mode is selected (NO in step S41), in step S42, the control part 290 of the image forming apparatus 200 determines whether or not to insert a slip sheet. Specifically, the control part 290 determines to insert a slip sheet in the first step S42. In the second and subsequent steps S42, the control part 290 may simply determine whether or not to insert a slip sheet in accordance with a method similar to that in step S6 of the first embodiment.

When YES in step S42, steps S43 to S46 are performed. Contents of steps S43 to S46 are the same as the contents of steps S7 to S10 illustrated in FIG. 7, respectively. Therefore, a description of steps S43 to S46 is omitted.

When NO in step S42, steps S47 to S51 are performed. Also after step S46, steps S47 to S51 are performed. Contents of steps S47 to S51 are the same as the contents of steps S1 to S5 illustrated in FIG. 7, respectively. Therefore, a description of steps S47 to S51 is omitted.

In step S52 after step S51, the control part 290 of the image forming apparatus 200 determines whether or not the print job has been completed. Contents of step S52 are the same as the contents of step S11 illustrated in FIG. 7. When NO in step S52, the process returns to step S41. When YES in step S52, the process ends.

Figure 19:
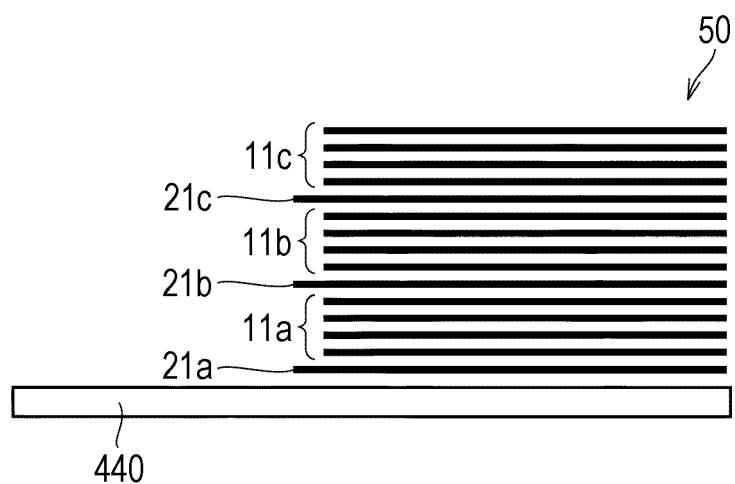
FIG. 19 is a view illustrating a stack of sheets stacked on a main tray in the sixth embodiment.

FIG. 19 is a view illustrating a stack of sheets stacked on a main tray in the sixth embodiment. As illustrated in FIG. 19, in a stack of sheets 50 on the main tray 440, a slip sheet 21a is inserted at the bottom, and output objects 11a are stacked on the slip sheet 21a. When a defined number of sheets of the output object 11a are discharged, a slip sheet 21b is inserted onto the output objects 11a, and output objects 11b are stacked on the slip sheet 21b. When a defined number of sheets of the output object 11b are discharged, a slip sheet 21c is inserted onto the output objects 11b, and output objects 11c are stacked on the slip sheet 21c. Also in the sixth embodiment, the user can easily sort a plurality of output objects 11 by using the slip sheet 21.

MODIFIED EXAMPLE

In the above description, the first cutting condition and the second cutting condition are set such that the length L2 of the side of the slip sheet 21 parallel to the sheet feeding direction is longer than the length L1 of the side of the output object 11 parallel to the sheet feeding direction. The first cutting condition and the second cutting condition are not limited thereto. For example, in a case where one output object 11 is cut out from the first sheet 10 along the CD direction, the first cutting condition and the second cutting condition may be set such that a length of a side of the slip sheet 21 parallel to the CD direction is longer than a length of a side of the output object 11 parallel to the CD direction.

The unnecessary sheet 22 created from the second sheet 20 may be discharged to the purge tray 450 of the sheet discharging apparatus 400 instead of the purge tray 340 of the cutting processor 300.

In a case where the fifth embodiment is combined with the sixth embodiment and the second mode is selected, the image forming apparatus 200 may simply determine, as the index image 27, the individual image 17 to be formed on the first sheet 10 after the second sheet 20 to be inserted, and form the index image 27 in the target area 26 of the second sheet 20.

Advantages

As described above, the image forming system according to the first to sixth embodiments includes the image forming apparatus 200, the cutting processor 300, and the main tray 440. The image forming apparatus 200 forms the job image 15 corresponding to a print job on a plurality of first sheets 10, and inserts the second sheet 20 between the plurality of first sheets 10. The cutting processor 300 sequentially performs cutting processing on the plurality of first sheets 10 and the second sheet 20 that are conveyed from the image forming apparatus 200. On the main tray 440, the output objects 11 obtained by the cutting processing on each of the plurality of first sheets 10 and the slip sheet 21 obtained by the cutting processing on the second sheet 20 are stacked. The cutting processor 300 performs cutting processing on each of the plurality of first sheets 10 in accordance with a first cutting condition, and performs cutting processing on the second sheet 20 in accordance with a second cutting condition different from the first cutting condition.

According to the above configuration, the user can easily specify the slip sheet 21 from the stack of sheets 50 discharged to the main tray 440. As a result, the user can easily sort the plurality of output objects 11 by using the slip sheet 21. That is, time and effort required for sorting work on the output objects 11 after the cutting processing is reduced.

The output object 11 and the slip sheet 21 have a rectangular shape. The first cutting condition and the second cutting condition may include a length of a side of the output object 11 and the slip sheet 21, respectively. The length included in the first cutting condition and the length included in the second cutting condition may be different.

According to the above configuration, the user can easily specify, as the slip sheet 21, a sheet having a length different from a length of a side of the output object 11.

The side is parallel to the sheet feeding direction. The length included in the second cutting condition is preferably larger than the length included in the first cutting condition.

According to the above configuration, the slip sheet 21 protrudes from the output object 11. Accordingly, the user can easily specify the slip sheet 21.

The first cutting condition may include the number of sheets of output object 11 to be obtained from each of the plurality of first sheets 10. The second cutting condition may include the number of sheets of the slip sheet 21 to be obtained from the second sheet 20. The number of sheets included in the first cutting condition may be different from the number of sheets included in the second cutting condition.

One slip sheet 21 may simply be cut out from the second sheet 20 along the sheet feeding direction. According to the above configuration, since the number of sheets included in the first cutting condition and the number of sheets included in the second cutting condition can be made different from each other, unnecessary cutting processing on the second sheet 20 can be reduced.

The image forming apparatus 200 may form the index image 27 on the second sheet 20. Accordingly, the user can easily specify the slip sheet 21 by checking the index image 27.

The image forming apparatus 200 may simply form the index image 27 in the target area 26 of the second sheet 20.

The target area 26 is preferably an area that protrudes from the output object 11 in the slip sheet 21 when the slip sheet 21 is discharged to the main tray 440.

According to the above configuration, the user can easily check the index image 27. As a result, the user can easily specify the slip sheet 21 on which the index image 27 is formed.

The index image preferably has a color different from a color of the plurality of first sheets 10. As a result, the user can easily specify the slip sheet 21 on which the index image 27 is formed.

The job image 15 may include the common image 16 common to the plurality of first sheets 10 and the individual image 17 that may be different among the plurality of first sheets 10. The image forming apparatus 200 preferably inserts the second sheet 20 when the individual image 17 changes.

According to the above configuration, the slip sheet 21 is inserted when the individual image 17 formed on the output object 11 changes. Therefore, by using the slip sheet 21, the user can easily sort the plurality of output objects 11 into a plurality of groups having mutually different individual images 17.

The index image 27 is preferably the individual image 17 formed on the first sheet 10 before or after the second sheet 20 is inserted among the plurality of first sheets 10 or an image related to the individual image 17.

According to the above configuration, by checking the index image 27, the user can easily specify the individual image 17 formed on the output object 11 stacked before or after the slip sheet 21 on which the index image 27 is formed.

The image forming apparatus 200 may form the index image 27 on a first surface and a second surface of the second sheet 20. The index image 27 formed on the first surface is preferably the individual image 17 formed on the output object 11 in contact with the first surface in the main tray 440 or an image related to the individual image 17. The index image 27 formed on the second surface is preferably the individual image 17 formed on the output object 11 in contact with the second surface in the main tray 440 or an image related to the individual image 17.

According to the above configuration, by checking the index image 27, the user can easily specify the individual image 17 formed on the output object 11 stacked before and after the slip sheet 21 on which the index image 27 is formed.

The image forming apparatus 200 preferably includes the first sheet feeding tray 241 to supply a plurality of first sheets 10 and the second sheet feeding tray 242 to supply the second sheet 20.

According to the above configuration, the user can easily distinguish the slip sheet 21 and the output object 11 by storing sheets of mutually different types (for example, colors) in the first sheet feeding tray 241 and the second sheet feeding tray 242.

Although embodiments of the present invention have been described and illustrated in detail, the disclosed embodiments are made for purposes of illustration and example only and not limitation. The scope of the present invention should be interpreted by terms of the appended claims, and it is intended to include all modifications within the meaning and scope equivalent to the claims.

What is claimed is:

1. An image forming system comprising:
   an image forming apparatus that forms a first image according to a job on a plurality of first sheets and inserts a second sheet between the plurality of first sheets;
   a cutting processor that sequentially performs cutting processing on the plurality of first sheets and the second sheet that are conveyed from the image forming apparatus; and
   a sheet discharging tray on which an output object obtained by the cutting processing on each of the plurality of first sheets and a slip sheet obtained by the cutting processing on the second sheet are stacked, the output object including the first image, wherein
   the image forming apparatus receives information on size of the first sheets from a user; determines a first cutting condition for the plurality of first sheets based on the information; and determines a second cutting condition for the second sheet based on the first cutting condition by adding a predetermined margin to the first cutting condition, the second cutting condition being different from the first cutting condition,
   the cutting processor performs the cutting processing on each of the plurality of first sheets in accordance with the first cutting condition, and performs the cutting processing on the second sheet in accordance with the second cutting condition, and
   the second sheet includes only the slip sheet among the output object and the slip sheet.

2. The image forming system according to claim 1, wherein
   the output object and the slip sheet have a rectangular shape,
   the first cutting condition and the second cutting condition include a length of a side of the output object and the slip sheet, respectively, and
   the length included in the first cutting condition is different from the length included in the second cutting condition.

3. The image forming system according to claim 2, wherein
   the side is parallel to a sheet feeding direction, and
   the length included in the second cutting condition is larger than the length included in the first cutting condition.

4. The image forming system according to claim 3, wherein the image forming apparatus forms a second image on the second sheet.

5. The image forming system according to claim 4, wherein
   the image forming apparatus forms the second image in a target area of the second sheet, and
   the target area is an area protruding from the output object in the slip sheet when the slip sheet is discharged to the sheet discharging tray.

6. The image forming system according to claim 4, wherein the second image has a color different from a color of the plurality of first sheets.

7. The image forming system according to claim 4, wherein
   the first image includes a common image common to the plurality of first sheets and an individual image that can be different among the plurality of first sheets,
   the image forming apparatus inserts the second sheet when the individual image changes, and the second image is the individual image formed on a first sheet among the plurality of first sheets before or after the second sheet is inserted or is an image related to the individual image.

8. The image forming system according to claim 4, wherein the first image includes a common image common to the plurality of first sheets and an individual image that can be different among the plurality of first sheets, the image forming apparatus inserts the second sheet when the individual image changes, and forms the second image on a first surface and a second surface of the second sheet, the second image formed on the first surface is the individual image formed on the output object in contact with the first surface on the sheet discharging tray or is an image related to the individual image, and the second image formed on the second surface is the individual image formed on the output object in contact with the second surface on the sheet discharging tray or is an image related to the individual image.

9. The image forming system according to claim 1, wherein the first cutting condition includes a number of sheets of the output object to be obtained from each of the plurality of first sheets, the second cutting condition includes a number of sheets of the slip sheet to be obtained from the second sheet, and the number of sheets included in the first cutting condition is different from the number of sheets included in the second cutting condition.

10. The image forming system according to claim 1, wherein the first image includes a common image common to the plurality of first sheets and an individual image that can be different among the plurality of first sheets, and the image forming apparatus inserts the second sheet when the individual image changes.

11. The image forming system according to claim 1, wherein the image forming apparatus includes:

a first sheet feeding tray to supply the plurality of first sheets; and a second sheet feeding tray to supply the second sheet.

12. The image forming system according to claim 1, wherein the image forming apparatus inserts the second sheet before the plurality of first sheets.

13. The image forming system according to claim 1, wherein from the second sheet, the cutting processor cuts out the slip sheet and an unnecessary sheet on a downstream side of the slip sheet in a sheet feeding direction, by the cutting processing on the second sheet, and the image forming system further includes:

a purge tray to which the unnecessary sheet is discharged.

* * * * *